United States Patent [19]
Jones et al.

[11] Patent Number: 5,610,263
[45] Date of Patent: Mar. 11, 1997

[54] WATER THINNED POLYMERIC VEHICLE FOR COATING COMPOSITIONS WITH LOW AMOUNTS OF VOLATILE ORAGNIC COMPOUNDS

[75] Inventors: Frank N. Jones, Ann Arbor, Mich.; Shou-Kuan Fu, Shanghai, China; Wen Jing, Ypsilanti, Mich.; Suru Zhang, Highland Park, N.J.

[73] Assignee: Eastern Michigan University, Ypsilanti, Mich.

[21] Appl. No.: 484,640

[22] Filed: Jun. 7, 1995

Related U.S. Application Data

[63] Continuation-in-part of Ser. No. 378,042, Jan. 24, 1995, abandoned, which is a continuation-in-part of Ser. No. 186,429, Jan. 25, 1994, abandoned, and a continuation-in-part of Ser. No. 186,430, Jan. 25, 1994, abandoned.

[51] Int. Cl.$^6$ .................................................. C08G 63/02
[52] U.S. Cl. ........................ 528/272; 428/480; 524/539; 524/597; 524/598; 525/442; 525/444; 528/193; 528/254
[58] Field of Search ......................... 524/539, 597; 525/442, 444; 528/193, 272, 254, 288, 302, 304; 428/480

[56] References Cited

U.S. PATENT DOCUMENTS

| | | | |
|---|---|---|---|
| 3,652,713 | 3/1972 | Okazaki et al. | 524/140 |
| 3,804,920 | 4/1974 | Cunningham et al. | 524/539 |
| 3,857,817 | 12/1974 | Henshaw et al. | 528/254 |
| 3,994,851 | 11/1976 | Chang | 524/598 |
| 4,072,662 | 2/1978 | van der Linde | 524/539 |
| 4,104,240 | 8/1978 | Buter | 524/539 |
| 4,128,526 | 12/1978 | Borman | 524/539 |
| 4,188,477 | 2/1980 | Smith et al. | 528/288 |
| 4,340,519 | 7/1982 | Kotera et al. | 523/414 |
| 4,459,401 | 7/1984 | Sekmakas et al. | 528/296 |
| 4,465,815 | 8/1984 | Chattha | 525/443 |
| 4,576,997 | 3/1986 | Trotter et al. | 525/444 |
| 4,631,320 | 12/1986 | Parekh et al. | 525/452 |
| 4,753,975 | 6/1988 | Vander Kooi, Jr. | 524/539 |
| 4,847,314 | 7/1989 | Tortorello et al. | 524/317 |
| 4,922,002 | 5/1990 | Calbo, Jr. et al. | 560/193 |
| 5,011,894 | 4/1991 | Robeson et al. | 525/437 |
| 5,025,061 | 6/1991 | Ishiodoya et al. | 524/539 |
| 5,041,476 | 8/1991 | Wilder | 524/80 |
| 5,043,192 | 8/1991 | Jones et al. | 430/109 |
| 5,057,392 | 10/1991 | McCabe et al. | 430/109 |
| 5,075,393 | 12/1991 | Thompson | 525/444 |
| 5,115,016 | 5/1992 | Dickens et al. | 524/513 |
| 5,134,222 | 7/1992 | Cooke et al. | 528/272 |
| 5,137,984 | 8/1992 | Kangas et al. | 525/411 |
| 5,143,985 | 9/1992 | Robeson et al. | 525/437 |
| 5,162,153 | 11/1992 | Cooke et al. | 428/373 |
| 5,162,455 | 11/1992 | Greene | 525/437 |
| 5,166,289 | 11/1992 | Yezrielev et al. | 525/433 |
| 5,171,778 | 12/1992 | Dekkers et al. | 524/539 |
| 5,194,569 | 3/1993 | Kim et al. | 528/206 |
| 5,210,155 | 5/1993 | Yezrielev et al. | 525/422 |
| 5,244,699 | 9/1993 | Jones et al. | 428/1 |
| 5,245,002 | 9/1993 | Kuo | 528/176 |
| 5,338,479 | 8/1994 | Panandiker et al. | 252/183.71 |

FOREIGN PATENT DOCUMENTS

| | | |
|---|---|---|
| 0014808 | 9/1980 | European Pat. Off. . |
| 0418631 | 3/1991 | European Pat. Off. . |
| 0419088 | 3/1991 | European Pat. Off. . |
| 2500308 | 7/1976 | Germany . |

OTHER PUBLICATIONS

"100–Percent–Solids, Liquid Finish", Products Finishing 96 (1993).

Muizebelt et al., "Permeabilities of Model Coatings: Effect of Crosslink Density and Polarity," pp. 110–114, Polymeric Materials for Corrosion Control© 1986 American Chemical Society.

Wicks, et al., Organic Coatings: Science and Technology, vol. II.: Applications, Properties, and Performance, pp. 280–282, Wiley 1994.

Wojcik, "Low Viscosity Polyisocyantes for Higher Solids Coatings," Paper Presented at ACS Meeting, Mar. 1994.

*Primary Examiner*—Terressa Mosley
*Attorney, Agent, or Firm*—Fitch, Even, Tabin & Flannery

[57] ABSTRACT

This invention provides a polymeric vehicle and formulated coating composition which are high in solids and use water to effect viscosities to permit application of such polymeric vehicles and formulated coating compositions with existing commercial application equipment. The polymeric vehicles and formulated coatings include at least one oligoester diol, a carbamate hardener, and in some instances, an additional crosslinking agent. The combination of oligoester diol with carbamate hardener provides a low viscosity coating composition with low to zero VOC content, and provides a coating binder with extremely good film properties.

18 Claims, No Drawings

WATER THINNED POLYMERIC VEHICLE FOR COATING COMPOSITIONS WITH LOW AMOUNTS OF VOLATILE ORAGNIC COMPOUNDS

This application is a Continuation-In-Part of application Ser. No. 08/378,042, filed Jan. 24, 1995, now abandoned, which is a Continuation-In-Part application of application Ser. Nos. 08/186,429 and 08/186,430, both filed on Jan. 25, 1994 both now abandoned.

This invention is directed to polymeric vehicles and formulated coating compositions for coating binders which are high in solids and use water to effect viscosities which permit the application of such polymeric vehicles or formulated coating compositions by existing commercial application equipment. More particularly, this invention is directed to polymeric vehicles and formulated coating compositions which compositions include at least one nonmesogenic oligoester diol, at least one carbamate hardener and in some instances additional crosslinker resins. These compositions are very high in solids and low in volatile organic compounds, and provide a coating binder with extremely good film properties. Further, this invention also is directed to controlling the viscosities of the aforedescribed polymeric vehicle and formulated coating composition as well as controlling or reducing volatile organic compounds (VOCs) emanating from such compositions.

DESCRIPTION OF THE PRIOR ART AND BACKGROUND

One of the primary components in paint is the "film former" that provides a film for the protective function for a substrate coated with the paint. Film forming components of liquid paints include resins which have required organic solvents to provide the resins with suitable viscosities such that the paint can be applied by existing commercial application equipment. Use of organic solvents, however, raises at least two problems. In the past and potentially in the future, petrochemical shortages mitigate against the use of organic solvent in great volumes. Second, environmental concern mitigates against the use of organic solvents and requires such use be minimized.

Environmental concern has become increasingly important. This concern not only extends to preservation of the environment for its own sake, but extends to public safety as to both living and working conditions. Volatile organic emissions resulting from coating compositions which are applied and used by industry and by the consuming public are not only often unpleasant, but also contribute to photochemical smog. Governments have established regulations setting forth guidelines relating to VOCs which may be released to the atmosphere. The U.S. Environmental Protection Agency (EPA) has established guidelines limiting the amount of VOCs released to the atmosphere, such guidelines being scheduled for adoption or having been adopted by various states of the United States. Guidelines relating to VOCs, such as those of the EPA, and environmental concerns are particularly pertinent to the paint and industrial coating industry which uses organic solvents which are emitted into the atmosphere.

To reduce organic solvent content and VOCs, researchers have developed high solids coating compositions and powdered coating compositions. High solids compositions generally are liquid and are designed to minimize solvents. Powdered coating compositions are solid powders and generally eliminate solvents. While each have advantages, each coating composition has disadvantages.

Coating compositions which include high solids polymeric vehicles based upon polyesters have become popular. Typically these compositions require the use of some organic solvents. In high solid polyesters as opposed to "conventional" compositions which use organic solvents, high molecular weight generally needs to be achieved during crosslinking rather than being attained from the basic polyester polymer. Hence, high solids polyesters normally supply a greater number of reactive sites (predominantly hydroxyl groups) available for crosslinking. The resultant polymers typically exhibit 70–80% solids-weight when reacted stoichiometrically with isocyanate crosslinkers, but frequently yield empirical solids up to 12% lower, when crosslinked with melamine resins. Despite their reduced use of organic solvents, high solids polyester coating compositions can be produced on the same equipment and be employed in many of the same applications as lower solids "conventional" polyester coating compositions. Further, as a result of their many strengths such as ease of manufacturing and use, low volatile emissions, reduced energy requirements, greater application efficiency, lower handling and storage costs, and excellent physical properties, high solids polyester coating compositions have enjoyed spectacular growth in manufacture and use. They still require organic solvents, however, and are a source of VOCs.

Powder coatings and UV-curable coatings are desirable ultrahigh or 100% solids coatings. However, there are limitations as to the technique and the equipment which are used to apply the powdered composition.

To reduce solvent content and VOCs in polymeric vehicles and formulated coating compositions for paints, researchers have been driven by three major objectives: controlling the reactivity of the film forming components in the paint; keeping the viscosity of the components in the paint low to minimize the organic solvents in the paint and to keep the VOCs in the paint at the lowest possible level; and keeping the components in the paint at a low volatility to minimize VOCs.

One way to reduce VOCs is to further reduce organic solvent content and increase the solids level of the coating composition to an ultra high solids level. High viscosity is a major problem which needs to be solved in ultrahigh solids coatings. In high solids polyester coatings, the viscosity of concentrated polyester solutions depends on several variables. Molecular weight and molecular weight distribution are two important factors. According to polymer physics theory, the viscosity of polymers in the liquid state depends mainly on the average molecular weight and the temperature, so it is desirable to reduce average molecular weight for solventless polyester coating. The major factor controlling number average molecular weight ($M_n$) of a polyester is the mole ratio of dibasic acid/diol or polyol. A dibasic acid to diol or polyol ratio of the order of 2:3 is typical. However, loss of polyol during the production of the polyester can result in a significantly higher number average molecular weight than predicted from the starting ratio. It is necessary to add some extra glycol to compensate for loss. Further, in ultra high solids coatings, the low molecular weight fraction of resin in the polymeric vehicle may be volatile enough to evaporate when a thin film is baked. Such loss has to be counted as part of the VOC emissions. Further, ultra-high solids polymeric vehicles also may include organic solvents and VOCs.

The number of functional groups per molecule also affects the viscosity because of hydrogen bonding. Most oligomers or polymers require high functionality to achieve a highly crosslinked film and reasonable glass transition temperatures (Tgs) to have adequate film properties for most applications. The high functionality tends to increase the viscosity significantly.

An object of the invention is to provide a polymeric vehicle which will reduce or eliminate VOCs.

Another object of this invention is to provide polymeric vehicles which are not only low in VOCs, but which provide coating binders with good film properties such as hardness and impact resistance.

Yet another object of this invention is to control the viscosity to low levels at a specific shear rate of a liquid polymeric vehicle or liquid formulated coating composition with the use of water and without using organic solvents for such control.

Further, objects and advantages of the invention will be found by reference to the following description.

SUMMARY OF THE INVENTION

The invention provides a liquid polymeric vehicle which is a solution and which polymeric vehicle is effective for providing an aqueous high solids polymeric vehicle or formulated coating composition which has at least 3 weight percent water, based upon the weight of the formulated coating composition. The polymeric vehicle comprises an oligoester diol having a polydispersity index of not greater than about 2.6, a carbamate hardener, and in an important aspect, an additional amino type crosslinker resin.

Broadly, the oligoester diol generally has a molecular weight and structure effective for providing a liquid formulated coating composition or liquid polymeric vehicle with a viscosity of less than about 1.5 Pa.s at of temperature of from about 20° C. to about 60° C. at a shear rate of about three sec.$^{-1}$. These viscosities are attained when the oligoester diol is combined with at least about three weight percent water, based upon the weight of the formulated coating composition, the carbamate hardener, and not more than three weight percent, based upon the weight of the formulated coating composition, organic solvent. In an important aspect, the formulated coating composition and polymeric vehicle do not have more than about three weight percent organic solvent and will imbibe at least eight weight percent water. In a very important aspect, the polymeric vehicle and formulated coating composition are solventless, that is without organic solvent except in trace amounts (less than 0.25%).

In a very important aspect of the invention, the oligoester diol is selected from the group consisting of a substantially linear oligoester diol, a linear oligoester diol and mixtures thereof. When the carbamate hardener is selected from the group consisting of a blocked polyisocyanate, a polyisocyanate, a blocked polyfunctional biuret, a polyfunctional biuret, a carbamate polyol, and mixtures thereof, it is reactive with the oligoester diol, or reactive with an additional crosslinker which is reactive with the oligoester diol. Alternatively, when the carbamate hardener is a polyisocyanate or carbamate polyol, it is reactive with the blocked polyisocyanate, blocked polyfunctional biuret as well as one or more additional amino type crosslinkers which also are reactive with the oligoester diol. In either case, the carbamate hardener is miscible with, but is not reactive with water.

The carbamate hardener and oligoester diol are in relative amounts effective for permitting the polymeric vehicle or the formulated coating composition to imbibe at least about 3 weight percent water, based upon the weight of the formulated coating composition and for providing a water thinned formulated coating composition with a viscosity of less than about 1.5 Pa.s, preferably about 1.2 Pa.s, at about 25° C. at a shear rate of about 3 sec.$^{-1}$. In an important aspect, the carbamate hardener and oligoester diol are in relative amounts effective for permitting the polymeric vehicle or the formulated coating composition to imbibe at least eight percent and preferably at least about 10 weight percent water to provide a polymeric vehicle effective for providing a water thinned formulated coating composition with the latter viscosities at 25° C. The polymeric vehicle of the invention also is effective for providing a coating binder having a hardness of at least about H when applied to and thermoset on a substrate at a thickness of one mil dry.

The combination of the substantially linear and/or linear oligoester diol with the carbamate hardener provides a low viscosity coating composition with a low (not more than about 200 g/L) to about zero VOC content. The use of the carbamate hardener in combination with the oligoester diol permits the addition of water to the carbamate hardener/ oligoester diol blend to further reduce the viscosity of the polymeric vehicle without increasing the VOC content thereof.

The viscosity of the oligoester diol is generally a function of its linearity, the more linear the diol, the lower the viscosity of the diol. Further, the viscosity of the oligoester diol and the VOCs which potentially emanate from the oligoester diol in the polymeric vehicle are a function of the polydispersity index (PDI) of the oligoester diol. Keeping the polydispersity index low, such as below about 2.6, preferably below about 2.2, and most preferably below about 1.4, helps control the viscosity of the oligoester diol, and hence, the viscosity of the polymeric vehicle and the formulated coating composition. High PDIs result in relatively high fractions of high molecular weight oligoester diols which increase viscosity beyond what would be ratably expected from the high molecular weight fraction of oligoester diol. Further, high PDIs also mean fractions of low molecular weight oligoester diol that would contribute to VOCs of the polymeric vehicle as a result of the low molecular fraction of the oligoester diol not being reacted and being made a part of the coating binder. These low molecular weight fractions evaporate rather than react in the thermosetting curing reaction for the coating binder, and as a result, may be considered a VOC.

The linearity of the oligoester diol may be decreased without effecting an increase of the viscosity of the formulated coating composition and without a deleterious effect on the properties of coating binder by using water as a thinning agent or solvent. The amount of water used is a function of the linearity (or nonlinearity) of the oligoester diol; and hence, the viscosity of the oligoester diol. In general, the more linear the oligoester diol, the less the viscosity of that diol at a given temperature, $M_n$ and PDI. At least about 3 weight percent of water, and in an important aspect at least eight weight percent water, may be added to reduce the viscosity of the formulated coating composition or polymeric vehicle with a relatively linear oligoester diol and with a carbamate hardener which is a polyisocyanate, blocked polyisocyanate or blocked polyfunctional biuret. To increase the amount of water in the system, to reduce the amount of polyisocyanate crosslinkers in the system, to increase the amount of nonlinear oligoester diol in the system (which also will increase the viscosity of the polymeric vehicle and formulated coating composition without the use of additional solvent) and to permit the use of other crosslinkers in the polymeric vehicle and formulated coating composition without a deleterious effect on the properties of the coating binder, carbamate hardener, other than blocked or unblocked polyisocyanates and biurets, may be added to the polymeric vehicle and formulated coating composition. These latter non-isocyanate carbamate hardeners are urethane polyols having a molecular weight of not more than about 1200 and a neat viscosity of not more than about 25 Pa.s at 25° C.

In general the viscosity of the polymeric vehicle which includes a blend of the oligoester diol and carbamate hardener will be in the range of from about 0.6 to about 10 Pa.s at from about 20° C. to about 60° C. at a shear rate of about 3 sec.$^{-1}$ in the absence of organic solvent and water. The amounts of oligoester diol and carbamate hardener and optionally one or more additional amino type resin crosslinkers in the polymeric vehicle will be in relative amounts to provide a viscosity of the blend in the range as aforesaid, and preferably a viscosity in the range of about 0.6 to about 8.0 Pa.s in the absence of organic solvent and water. In the aspect of the invention which uses only oligoester diol and blocked or unblocked polyisocyanate and/or biuret as the carbamate hardener, the polymeric vehicle comprises from about 25 to about 80 weight percent blocked or unblocked polyisocyanate and/or blocked or unblocked polyfunctional biuret carbamate hardener, based upon the combined weight of the oligoester diol and carbamate hardener, and from about 20 to about 75 weight percent oligoester diol. If the carbamate hardener includes a polyurethane polyol such as a polyurethane diol with the use of a crosslinker and optionally at least one blocked or unblocked polyisocyanate or blocked or unblocked polyfunctional biuret crosslinker, the polyurethane diol and polyisocyanate or polyfunctional biuret are present in an amount effective to provide the coating binder with from about 3 to about 20 weight percent carbamate groups [—OC(=O)N(—H)—], based upon the weight of the coating binder.

The oligoester diol has a number average molecular weight in the range of from about 275 to about 3000 and, in an important aspect, is linear or substantially linear. The oligoester diol has a main longitudinal chain which has chain segments having the structures —CH$_2$—, —O—, —C(=O)—. When the oligoester diol is substantially linear, to a limited extent it may have segments with structures —(R)CH— and —(R)$_2$C— wherein R is methyl or ethyl and the chain is terminated with hydroxyl groups. Generally R will be methyl.

In another aspect, the invention provides a method for controlling the viscosities of the polymeric vehicle and formulated coating composition at a specific shear rate by controlling the relative amounts of linear and substantially linear nonmesogenic oligoester diol and carbamate hardener such that when the oligoester diol and carbamate hardening are combined, the blend of the oligoester diol and carbamate hardener will be in relative amounts effective to provide (1) a water thinned formulated coating composition having at least 3 weight percent water, and in an important aspect, at least about 8 weight percent water, and having a viscosity of from about 0.1 to about 1.5 Pa.s at a temperature of from about 20° C. to about 60° C. at a shear rate of about 3 sec.$^{-1}$, and (2) a coating binder with a hardness of at least about H after a thermosetting cure at a binder thickness of about one mil dry.

DESCRIPTION OF THE PREFERRED EMBODIMENTS

"Polyester" means a polymer which has

linkages in the main chain of the polymer. "Oligomer" means a compound that is a polymer, but has a number average weight not greater than about 10,000 with or without repeating monomeric units. "Non-oligomeric" is a compound that does not have repeating monomer units along a main chain. "Crosslinker" means a di- or polyfunctional substance containing functional groups that are capable of forming covalent bonds with hydroxyl groups that are present on the oligoester diol and carbamate hardener which may include the urethane polyol. Amino resins are members of this class; melamine resins are a sub-class of amino resins. "Polymeric vehicle" means all polymeric and resinous components in the formulated coating, i.e., before film formation, including but not limited to the linear and/or substantially linear oligoester diol and hardening carbamate crosslinker. "Coating binder" means the polymeric part of the film of the coating after solvent has evaporated after baking and after crosslinking. "Formulated coating composition" means the polymeric vehicle, water and possibly optional organic solvents, as well as pigments, catalysts and additives which may optionally be added to impart desirable application characteristics to the formulated coating and desirable properties such as opacity and color to the film.

As used herein "high solids" means 75 weight percent solids under ASTM test D-2369-92.

"Polydispersity index" (PDI) means the weight average molecular weight ($M_w$) divided by the number average molecular weight ($M_n$), PDI=$M_w/M_n$.

"VOC" means volatile organic compounds. "Low VOC" means less than about 200 grams VOCs per liter of polymeric vehicle not including water.

"Substantially solventless" means a polymeric vehicle or formulated coating composition having not more than about five weight percent organic solvent.

"Substantially linear oligoester diol" means an aliphatic diol that has a main longitudinal chain terminated with hydroxyl groups and which chain has chain segments having the structures —CH$_2$—, —O—, —C(=O)— and to a limited extent may have segments with the structures —(R)CH— and —(R)$_2$C— wherein R generally is methyl or ethyl. Most often R will be methyl. A substantially linear oligoester diol may be completely linear and is made by polymerizing linear dicarboxylic acids such as HOOC(CH$_2$)$_n$COOH with linear diols such as HO(CH$_2$)$_m$OH. The reaction mixture may contain, however, a proportion of "branched" comonomers, usually diols which bear branches which are usually methyl and ethyl. Not more than about 6 percent of the number of hydrogens along the main chain of the oligoester can be substituted with carbon atoms. Alternatively the oligoester diol will have a branching index, as defined below, of not more than about 0.1.

The branching index is defined as $$\text{branching index} = \frac{(C_s + 2C_d)(B_1 - 1)}{C_1 + C_s + 2C_d};$$

Where $C_1$=the average number of linear components per oligomer molecule;

$C_s$=the average number of components with single branches per molecule;

$C_d$=the average number of components with double branches per molecule;

$B_1$=the average length, in atoms, of branches.

"Diol" is a compound or oligomer with two hydroxyl groups. "Polyol" is a compound or oligomer with two or more hydroxyl groups. As used in this application, "polymer" means a polymer with repeating monomeric units as defined herein and includes oligomers as defined herein.

"Solvent" means an organic solvent.

"Organic solvent" means a liquid which includes but is not limited to carbon and hydrogen which liquid has a boiling point in the range of from about 30° C. to about 300° C. at about one atmosphere pressure. It does not include the urethane diol.

"Volatile organic compounds" are defined by the U.S. Environmental Protection Agency at 40 C.F.R. 51.000 of the Federal Regulations of the United States of America as any compound of carbon, excluding carbon monoxide, carbon dioxide, carbonic acid, metallic carbides or carbonates, and ammonium carbonate, which participates in atmospheric photochemical reactions.

This includes any such organic compound other than then following, which have been determined to have negligible photochemical reactivity: methane; ethane; methylene chloride (dichloromethane); 1,1,1-trichloroethane (methyl chloroform); 1,1,1-trichloro-2,2,2-trifluoroethane (CFC-113); trichlorofluoromethane (CFC-11); dichlorodifluoromethane (CFC-12); chlorodifluoromethane (CFC-22); trifluoromethane (FC-23); 1,2-dichloro-1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HF-134a); 1,1-dichloro 1-fluoroethane (HCFC-141b); 1-chloro 1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); and perfluorocarbon compounds which fall into these classes:

(i) Cyclic, branched, or linear, completely fluorinated alkanes;

(ii) Cyclic, branched, or linear, completely fluorinated ethers with no unsaturations;

(iii) Cyclic, branched, or linear, completely fluorinated tertiary amines with no unsaturations; and (iv) Sulfur containing perfluorocarbons with no unsaturations and with sulfur bonds only to carbon and fluorine. Water is not a VOC.

A "high solids formulated coating composition" means an aqueous formulated coating composition containing more than about 75 weight percent solids as per ASTM test D-2369-92. "Film" is formed by application of the formulated coating composition to a base or substrate, evaporation of solvent, if present, and crosslinking.

"Dispersion" in respect to a polymeric vehicle, formulated coating composition, or components thereof means that the composition must include a liquid and particles which particles are detectable by light scattering.

"Dissolved" in respect to a polymeric vehicle, formulated coating composition or components thereof means that the material which is dissolved does not exist in a liquid in particulate form where the particles are detectable by light scattering.

"Soluble" means a liquid dissolved in a liquid or a solid dissolved in a liquid. "Miscible" means a liquid which is dissolved or soluble in a liquid. "Imbibe water" means a liquid is miscible with water.

"Carbamate hardeners" means a blocked or unblocked di or polyisocyanate, blocked or unblocked di or polyfunctional biurets, such as,

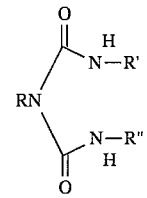

Where R, R' and R" is a residue of a diisocyanate such as HDI which upon reaction with a hydroxyl group provides carbamate [—OC(=O)N(—H)—] linkages and/or a di or polyfunctional composition which is reactive with the oligoester diol or is crosslinked with the oligoester diol and has carbamate linkages. The carbamate hardener either has carbamate linkages (such as a polyurethane) or forms carbamate linkages upon reaction with a hydroxyl group (such as a reaction between an isocyanate group with a hydroxyl group). While not being intended to be bound by any theory, the carbamate linkage is important to the performance of the coating binder. In an important aspect of the invention, the carbamate hardener is a polyurethane polyol which is reactive with a blocked or unblocked polyisocyanate and/or blocked or unblocked polyfunctional biuret and additional crosslinkers. The polyisocyanates, biurets and additional crosslinkers are reactive with hydroxyl groups which are a part of the oligoester diol and the polyurethane diol.

"Not reactive with water" means that the constituents of the coating react slowly enough with water that the film properties are not substantially changed by water during the time and at the temperature needed for application. With the simultaneous mixing of water into a system with unblocked isocyanate and almost immediate application, the system need only be stable for about 15 seconds. The required stability of the polymeric vehicle is highly dependent upon the means of application and how quickly the polymeric vehicle or formulated coating composition is applied.

The polymeric vehicle comprises a blend of at least one nonmesogenic oligoester diol and at least one carbamate hardener reactive with the oligoester diol or reactive with an additional crosslinker which is reactive with the oligoester diol. In a very important aspect of the invention, the oligoester diol is substantially linear or linear. The carbamate hardener is not reactive with water. The carbamate hardener and oligoester diol are in relative amounts effective for permitting the polymeric vehicle or formulated coating composition to imbibe at least about 3 weight percent water, and in an important aspect, at least about 8 weight percent water, based upon the weight of the formulated coating composition. The water, oligoester diol and carbamate hardener blend provides a water thinned formulated coating composition with a viscosity of less than about 1.5 Pa.s, preferably about 1.2 Pa.s at about 25° C. The polymeric vehicle is effective for providing a coating binder having a hardness of at least about H when applied to and thermoset on a substrate at a thickness of one mil dry.

In general the viscosity of the polymeric vehicle which includes a blend of the oligoester diol, carbamate hardener and optional additional crosslinker will be in the range of from about 0.6 to about 10 Pa.s at from abut 20° C. to about 60° C. at a shear rate of about 3 sec.$^{-1}$ in the absence of water and organic solvent. In general the polymeric vehicle comprises from about 20 to about 75 weight percent oligoester diol, based upon the combined weight of the oligoester diol and carbamate hardener, and from about 25 to about 80 weight percent carbamate hardener. In the aspect of the invention which uses oligoester diol and only blocked or unblocked polyisocyanate and/or blocked or unblocked polyfunctional biuret as the carbamate hardener, the polymeric vehicle comprises from about 20 to about 70 weight percent polyisocyanate and/or biuret, based upon the combined weight of the oligoester diol and carbamate hardener, from about 30 to about 80 weight percent oligoester diol. If the carbamate hardener includes a hydroxyl terminated carbamate such as a polyurethane polyol with the use of a crosslinker which may include at least one blocked or unblocked polyisocyanate and/or blocked or unblocked polyfunctional biuret, the polyurethane polyol and polyisocyanate or polyfunctional biuret are present in an amount effective to provide the polymeric vehicle from about 3 to about 20 weight percent carbamate groups, based upon the weight of the coating binder. In an important aspect of the invention, the blend comprises from about 20 to about 60 weight percent oligoester diol, from about 5 to about 35 weight percent blocked or unblocked polyisocyanate and/or polyfunctional biuret, from about 5 to about 50 weight percent polyurethane polyol and from about 10 to about 50 weight percent of an additional crosslinker such as a poly amino-type crosslinker which is reactive with the oligoester polyol and polyurethane polyol. In a very important aspect of the invention the additional crosslinker is a melamine resin.

The substantially linear oligoester diol has a number average molecular weight in the range of from about 275 to about 3000 and a polydispersity index of not more than about 2.6, and preferably not more than 2.2. It has a main longitudinal chain which as chain segments having the structure —CH$_2$—, —O—, —C(=O)—, —(R)CH— and —(R)$_2$C— wherein R is most often ethyl and methyl with R generally being methyl. Not more than about 8 percent of the hydrogens along the main chain of the oligoester diol may be substituted with a carbon to provide the branching such as the methyl and ethyl branching. The branching should be minimized to the lowest level that will prevent crystallization of the oligoester diol at temperatures above the intended application temperature of the polymeric vehicle and formulated coating composition. This temperature is usually from about 25° C. to about 50° C. and preferably above about 0° C. The oligoester diol is liquid below about 50° C. when in the environment of the hardening carbamate crosslinkers.

The use of a linear and/or substantially linear oligoester diol with a PDI of not more than 2.6 in the polymeric vehicle is important because it has a low viscosity, but has a sufficiently low evaporation rate such that the oligoester has at least about or more than 93 weight percent solids when tested by ASTM-D2369 test. This minimizes the VOC content of the oligoester where the VOCs result from the molecular weight fractions of the oligoester that evaporate upon baking.

The substantially linear oligoester diol may be made by esterifying linear dicarboxylic acids such as HOOC(CH$_2$)$_n$COOH (where n=2 to 14) with linear diols such as HO(CH$_2$)$_m$OH (where n=2 to 16) using techniques such as catalyzed direct esterification, catalyzed transesterification or a catalyzed esterification reaction using dicyclohexylcarbodiimide (DCC). Zinc acetate may be used as a catalyst in the transesterification reaction, a solution of p-toluenesulfonic acid in pyridine may be used in the reaction using DCC and p-toluenesulfonic acid or boric acid may be used as catalysts in the direct esterification reaction. Levels of catalyst should be kept low (such as about 0.1 weight percent for zinc catalyst) so that the resulting ester diol will not be overly reactive with isocyanate. Diols which may be used to make the substantially linear oligoester diol include 1,3-propane diol, 1,4-butanediol, 1,5-pentanediol, 1,6-hexanediol, 1,9-nonanediol, diethylene glycol, triethylene glycol and tetraethylene glycol. Diacids which may be used to make the substantially linear oligoester diol include adipic acid, glutaric acid, azelaic acid, decanedioic acid, and dodecandioic acid. These monomers are completely linear and will provide completely linear oligoester diols. Completely linear oligoester diols do not have any branching at all.

While the oligoester diols of this invention may be completely linear, they may only have to be substantially linear and monomers with some branching may be mixed with the completely linear monomers. Examples of monomers which may be mixed with the linear monomers to form substantially linear oligoester diols are 1,3-butanediol, 2-ethyl-1-6-hexanediol, 2,2,4-trimethylpentanediol, neopentyl glycol, HOOCCH(CH$_3$)CH$_2$CH$_2$COOH, and 2-ethyl-2-n-butyl-1,3-propane diol.

The substantially linear oligoester diols also may be made by the catalyzed transesterification reaction of the corresponding ester of the diacid with the diols as described above. The corresponding esters of the diacids include dimethyl azelate, dimethyl glutarate, dimethyl adipate, dimethyl decanedioate and dimethyl dodecanedioate. Mixtures of two or more of the acids or esters thereof and two or more diols may be cotransesterified and may be used to make the substantially linear oligoester diol. Examples of such mixtures include a cotransesterified mixture of dimethyl azelate with 1,4-butanediol and 1,6-hexanediol; a cotransesterified mixture of dimethyl azelate and dimethyl adipate (1:1 molar ratio) and 1,4-butanediol which mixture provides a viscosity of 0.72 Pa.s at 3 rpm at 25° C; a cotransesterified mixture of dimethyl azelate and diethyl dodecanedioate (1:1 molar ratio) with the diols 1,4-butanediol, diethylene glycol and 1,10-decanediol (2:1:1 molar ratio).

A substantially linear oligoester diol which is useful in the invention has the general formula

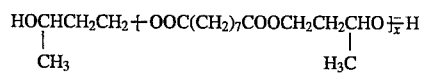

wherein $\bar{x}$=about 1.5 to 4.

The amount of branching in the oligoester diol to effect a melting point reduction and crystallinity reduction as described above varies with the particular combination of "linear" monomers and the characteristics of the branched comonomer. As a broad rule, the mol ratio of the branched diol to linear diol should not need to exceed 1:1 for branched diols having a single methyl side chain, such as 1,2-propanediol, or 0.67:1 for branched diols having an ethyl side chain, such as a 1,2-butanediol or two methyl side chains, such as neopentyl glycol.

The polydispersity index of the substantially linear oligoester may be obtained by synthesizing the oligomer through a direct esterification reaction, a transesterification reaction or by an esterification reaction using reactants such as dicyclohexylcarbodiimide (DCC). Careful use of these techniques can yield products with a polydispersity index as low as 1.4. The polydispersity index of the oligoester may be lowered to levels below 1.4 by purification of the oligoester product such as by extraction of the volatile low molecular weight fractions or by vacuum stripping of such fractions. Using these techniques a polydispersity index of 1.1 or even lower may be obtained.

The linear oligoester diol and/or mixture of such diols has a polydispersity index ($M_w/M_n$) of less than about 2.6, preferably less than 2.2, preferably in the range of from about 1.4 to about 1.8, and most preferably less than about 1.4, and a viscosity in the range of from about 0.1 to about 1.2 Pa.s at a temperature in the range of from about 20° C. to about 50° C. as measured on a Brookfield thermocell viscometer model DV-II+ using a SC4-31 spindle at 6 rpm.

The linear oligoester diol has a main chain having only chain segments having the structures —$CH_2$—, —O— and —C(=O)—. The main chain is terminated with —OH groups. The linear longitudinal chain of the linear oligoester diol is substantially without any side chain or group. This linearity reduces the viscosity of the oligoester relative to an oligomer even with relatively small amounts of branching. "Substantially without" means that the oligomer does not have more than about 3 weight percent of the chain segments, other than —$CH_2$—, —O— and —C(=O)— and the terminating hydroxyl group, with a branch extending therefrom. Side chains, if they exist, should not raise the viscosity of the linear oligoester diol above the range of about 0.1 to about 1.2 Pa.s as set forth above.

The number average molecular weight of the linear oligoester is controlled such that the oligoester has at most a small low molecular weight fraction which will be a source for evaporation or VOCs upon the application of heat for the thermosetting of the coating binder. In this connection and as previously noted, the linear oligoester diol has a polydispersity index ($M_w/M_n$) of less that 2.6, preferably less than about 2.2 and preferably in the range of from about 1.4 to about 1.8, and most preferably less than about 1.4. Relative to its molecular weight the oligoester diol has a low viscosity (about 0.1 to about 1.2 Pa.s as set forth above) on the Brookfield viscometer which produces a shear rate of about 2 sec.$^{-1}$. The slow evaporation rate of the oligoester, its linearity and the control of the number average molecular weight such that unreacted monomers and oligoesters with molecular weights below about 250 are minimized are important factors such that the viscosity of the oligoester and the polymeric vehicle are sufficiently low to permit a formulated coating composition with a useable viscosity that permits its application without the addition of organic solvents.

Typical linear oligoesters which may be used in the invention have the general formulas:

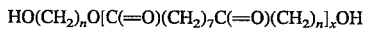

$$HO(CH_2)_nO[C(=O)(CH_2)_7C(=O)(CH_2)_n]_xOH$$

where n=2 to 12 and x=1 to 5;

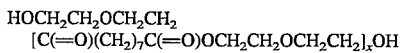

$$HOCH_2CH_2OCH_2CH_2[C(=O)(CH_2)_7C(=O)OCH_2CH_2OCH_2CH_2]_xOH$$

where x=1 to 5; and

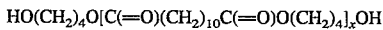

$$HO(CH_2)_4O[C(=O)(CH_2)_{10}C(=O)O(CH_2)_4]_xOH$$

where x=1 to 4.

Even numbered diacids (acids having even numbers of carbon atoms) tend to provide oligomers with melting points which are too high, except when used as mixtures. Hence, acids which have an odd number of carbon atoms are preferred.

In a preferred embodiment of the invention, the nonmesogenic linear oligoester diol in the polymeric vehicle has the general formula

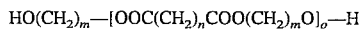

$$HO(CH_2)_m—[OOC(CH_2)_nCOO(CH_2)_mO]_o—H$$

wherein o>1 and <6, m=2 to 16, n=0 to 12. In respect to this aspect of the invention, it has been found that oligoester diols where o=2, m=4, 7 and 10 and n=4 and 7 are particularly useful. The oligoester diol where m=7 and n=4 has a single, broad melting point at about 40° C. and its viscosity is low, such as 0.2 Pa.s at 50° C. The oligoester diol where m=4 and n=7 has a melting point of about 30°–37° C. and a viscosity of about 3 Pa.s at 40° C.

As with the substantially linear oligoester diol, the polydispersity index of the linear oligoester may be obtained by synthesizing the oligomer through a direct catalyzed esterification reaction, a catalyzed transesterification reaction or by a catalyzed esterification reaction using reactants such as dicyclohexylcarbodiimide (DCC). Careful use of these techniques can yield products with a polydispersity index as low as 1.4. The polydispersity index may be lowered to levels below 1.4 by purification of the oligoester product such as by extraction of the volatile low molecular weight fractions or by vacuum stripping of such fractions. Using these techniques a polydispersity index of 1.1 or even lower may be obtained.

Typical linear oligoester diols include the reaction products of linear aliphatic dicarboxcylic acids having not more than about 16 carbon atoms or esters thereof such as azelaic acid, glutaric acid, adipic acid, decanedioic acid, dodecanedioic acid, succinic acid, dimethyl azeleate, dimethyl glutarate, dimethyl succinate, dimethyl adipate, dimethyl decanedioate and dimethyl dodecandioate with one or more linear diols having not more than about 16 carbon atoms such as ethylene glycol, 1,3-propanediol, 1,4-butanediol, 1,5-pentanediol, 1,6 hexanediol, 1,9-nonanediol, diethylene glycol, triethylene glycol and tetraethylene glycol. As used herein, linear aliphatic dicarboxycylic acid means an acid with divalent segments having only the structures —$CH_2$—, —O— and —C(=O)-terminated with —COOH. As used herein linear diol means a diol with segments having the structures —$CH_2$— and —O— terminated with —OH. Mixtures of the acids or esters thereof and diols may be cotransesterified and may be used to achieve certain melting points and molecular weights. Examples of such mixtures include a cotransesterified mixture of dimethyl azeleate with equal weights of 1,4-butanediol and 1,6-hexanediol which provides a product having a viscosity of 0.65 Pa.s at 30° C.; a cotransesterified mixture of dimethyl azeleate and dimethyl adipate (1:1 molar ratio) and 1,4-butanediol with $M_n$=920 which mixture provides a viscosity of 0.72 Pa.s at 6 rpm at 25° C; a cotransesterified mixture of dimethyl azeleate and diethyl dodecanedioate (1:1 molar ratio) with the diols 1,4-butanediol, diethylene glycol and 1,10-decanediol (2:1:1 molar ratio). A particularly useful oligoester diol may be prepared from 1,4-butanediol and a mixture of the dimethyl esters of HOOC ($CH_2$)$_n$COOH, n=3, 4 and 7 in a 1:1:1 molar ratio to provide oligoester diols with number average molecular weights such as 310, 520 and 840.

The carbamate hardener may be a solid, but generally it is a liquid which is miscible in water and is selected from the group consisting of a blocked or unblocked polyisocyanate, a blocked or unblocked polyfunctional biuret, a carbamate polyol such as a polyurethane polyol including a polyurethane diol and mixtures thereof. If the hardener is a solid, it is soluble in the oligoester diol/water blend, or in the oligoester diol, crosslinker water/organic solvent blend where organic solvent is in an amount such that it does not comprise more than about three percent of the polymeric vehicle. In all cases, the carbamate hardener does not raise the viscosity of the formulated coating composition or a blend of the oligoester diol, hardener, optional additional crosslinker and water above a viscosity of from about 0.1 to about 1.5 Pa.s at a temperature of from about 20° to about 60° C. at a shear rate of 3 sec.$^{-1}$. The carbamate hardener also is not reactive with water.

Properties, such as adhesion and hardness of the coating binder can be substantially enhanced by incorporating carbamate

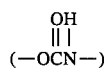

linkages into the crosslinked network. This can be achieved by use of a blocked or unblocked polyisocyanate and/or blocked or unblocked polyfunctional biuret alone or in combination with at least one polyamine resin such as a melamine resin crosslinker, and also by incorporating a polycarbamate polyol which is capable of crosslinking through its —OH groups with amino-type crosslinkers and poly-isocyanate and biurets. Use of polycarbamate polyols tend to increase the capacity of the coating to imbibe water while polyisocyanates/biurets tend to have the opposite effect.

Polyisocyanates which may be used in the invention include the cyclo-trimer of 1,6-hexmethylene diisocyanate (HDI) which has the idealized structure of which is shown below:

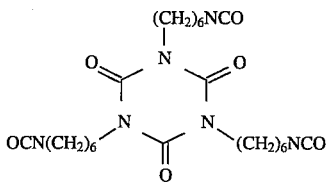

Its viscosity is 1800–4000 mPa.s at 25° C. and its equivalent weight is 194. It is commercially available as Desmodur N3300 from Miles Corporation. Another polyisocyanate which may be used in the invention is Luxate XHD 0700 available from Olin Corporation which is a mixture of cyclo-dimer and cyclo-trimer of 1,6-hexamethylene diisocyanate as shown below:

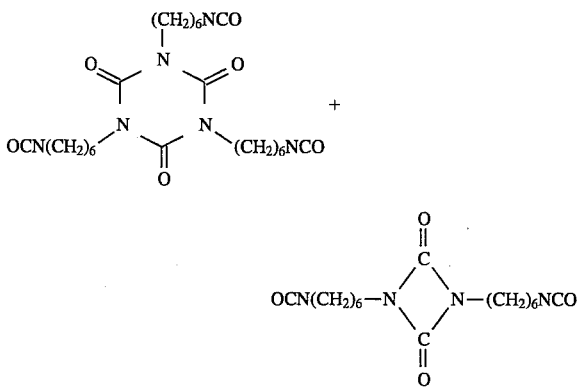

Other polyisocyanates which may be used in the invention include isophorone diisocyanate (IPDI or 3-isocyanatom-ethyl-3,5,5-trimethylcyclohexyl isocyanate) and HDI. Biurets which may be used in the invention include the biuret of HDI which has the structure

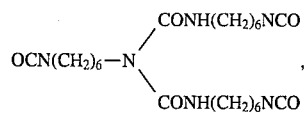

and is commercially available as Desmodur N3200 from Miles Corporation. It is reported that its viscosity was 1300–2200 mPa.s at 25° C., and its equivalent weight is 181.

The polyisocyanates and polybiurets are blocked as is known to reduce their activity and provide water compatibility. Blocking agents include methanol, acetone oxime, methyl ethyl ketoxime, 2-acetone oxime, ε-caprolactam, and 2,2-dimethyl-1,3-dioxane-4,6-dione. The polyisocyanates may be blocked by refluxing the polyisocyanate with the blocking agent. By way of example, methanol-blocked-polyisocyanate of Desmodur N3300 (M-b-D) may be prepared by reacting Desmodur N3300 with an excess of methanol at reflux temperature (about 60°–65° C.) for 6 hours stirring with a magnetic bar and without catalyst under a flux of dried nitrogen. Excess methanol is removed under vacuum at room temperature. Acetone oxime-blocked-isocyanate of Desmodur N3300 (A-b-D) may be prepared in the same procedures as that for M-b-D except only using an equivalent weight of acetone oxime as blocking agent and ethyl acetate as solvent instead of methanol.

Unblocked polyisocyanates and biurets which may be used in the invention include the cyclo-trimer of 1,6-hexmethylene (HDI), Luxate XHD 0700, IPDI, and Desmodur N3200.

As previously stated, the carbamate hardener may also be carbamate polyol. The carbamate polyol is usually a liquid having a viscosity in the range of from about 2 to about 25 Pa.s at about 25° C. In an important aspect of the invention the carbamate hardener is polyurethane polyol. When in the form of a carbamate polyol the carbamate hardener is present in an amount to provide the coating binder with from about 3 to about 20 weight percent carbamate groups after the polymeric vehicle is cured based upon the weight of the coating binder. In general the carbamate polyol has a molecular weight in the range of from about 298 to about 1200 to provide the aforedescribed viscosity. It is miscible with water and is reactive with the blocked or unblocked polyisocyanates and blocked or unblocked polyfunctional biurets and other optional crosslinkers, which optional crosslinkers also are reactive with the hydroxyl groups of the oligoester diols. In particularly important aspect of the invention the hardening carbamate crosslinker is a polyurethane diol having the formula

where R' and R=aliphatic diradical having at least some —(CH$_2$)$_6$—, a hydroxyl equivalent weight of 160 a viscosity of about 7.0 Pa.s at 50° C. and is commercially available as K-Flex UD320-100 from King Industries. In another important aspect the hardening carbamate crosslinker has generally the same formula as K-Flex UD320-100 but is in about 10% water has a hydroxyl equivalent weight of about 178 and has a viscosity of about 8.0 Pa.s at 25° C. It also may be obtained from King Industries.

The carbamate polyol may be used as a carbamate hardener together with a polyfunctional amino-type crosslinker, particularly a melamine resin. In another important aspect of the invention the carbamate polyol may be used in combination with the blocked or unblocked polyisocyanate and/or blocked or unblocked polyfunctional biuret. In yet another aspect the carbamate polyol may be used in combination with the amino-type crosslinker and the blocked or unblocked polyisocyanates and/or blocked or unblocked biurets.

The additional crosslinker generally is a liquid which is miscible in the blend of oligoester diol, hardener and water, but under certain conditions may be a solid if that solid is soluble in such blend and if the viscosity of the formulated coating composition and polymeric vehicle does not exceed the ranges described herein. These crosslinkers which are additional to the carbamate hardener may be an amino-type crosslinker. The polyfunctional amino-type crosslinker is usually made from amidines, ureas or amides by reaction with formaldehyde and subsequently with an alcohol. These crosslinkers will react with the hydroxyls of the linear oligoester and hardening carbamate crosslinker polyol. Melamine resins are a subclass of amino resins and also may be referred to as "melamine-formaldehyde resins" or "alcoholated melamine-formaldehyde resin." The additional crosslinker has an average functionality, which is reactive with the hydroxyls of the oligoester diol and hardening carbamate crosslinker, of greater than about 2.4. When it is a liquid, it has a viscosity of less than about 3.0 Pa.s at about 25° C. Suitable additional crosslinkers include, but are not limited to melamine formaldehyde types such as hexakis (methoxymethyl) melamine resins (HMMM), monomeric mixed ether (methyl and butyl) melamine resins, and methoxymethyl urea resins. A highly alkylated hexamethoxymethylmelamine (HMMM) resin with the following general formula is a very suitable crosslinker:

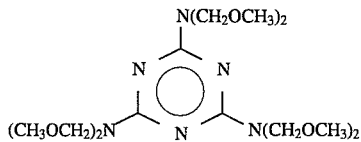

The latter HMMM resin appears to be a waxy solid under most conditions with a melting point in the range of about 30° C. and is sold by Cytec Chemical Company under the name Cymel 300. A similar crosslinker which is a melamine resin which can be used in the invention is a highly monomeric, highly methylolated hexamethylolated melamine formaldehyde resin which appears to be a solid under most conditions at 25° C. and is sold by Monsanto Chemical Company under the designation HM-2612.

The reaction between the oligoester diol and carbamate hardener which provides the coating binder is a catalyzed reaction. Typical catalysts for isocyanate crosslinking reactions include soluble tin catalysts such as dibutyl tin dilaurate and tertiary amines such as diazabicyclo [2.2.2] octane. Typical catalysts for the amino resin crosslinking reactions include para toluene sulfonic acid (p-TSA), dodecyl benzene sulfonic acid and dinonyl nathphalene disulfonic acid. Typically the catalyst comprises from about 0.1 to about 3.0 weight percent of the blend of oligoester and crosslinker, based upon the weight of the oligoester, crosslinker and catalyst.

The method of controlling the viscosity of the polymeric vehicle and formulated coating composition at a particular shear rate is practiced by providing the coating composition with the linear and/or substantially linear oligoester diol, and mixing the oligoester with the carbamate hardener and any optional amino-type crosslinker with the functionality and viscosity as aforesaid. The viscosity of the mixture to provide a polymeric vehicle or formulated coating composition is adjusted with water to provide a water-thinned polymeric vehicle and formulated coating composition as foresaid. Maintaining the linearity or substantial linearity of the oligoester, maintaining the polydispersity index of the oligoester and providing a carbamate hardener which permits the addition of water which is miscible with the oligoester diol as aforesaid permits control of the viscosity of the coating composition which eliminates the use of organic solvents in a way and in an amount heretofore not previously known.

The formulated coating compositions are made by mixing the polymeric vehicle with pigments, catalysts and additives such as defoamers, pigment dispersants anticrating agents and rheology modifiers. Pigment dispersion stabilizers may have to be carefully selected so as to not unduly increase the viscosity of the system. Johncryl-60 form S.C. Johnson Chemicals, which is believed to be a high acid number acrylic copolymer, works well. The formulated coating compositions have a viscosity which permits it to be applied to a substrate by spraying, dipping, roll coating, brushing or using other known application equipment and thereafter thermosetting the coating composition by the application of heat in the temperature range of from about 20° C. to about 300° C. for about 0.5 to about 60 minutes. The following examples set forth compositions according to the invention and how to practice the method of the invention.

EXAMPLE I

Synthesis of oligoester diols which are the reaction product of 1,4-butane-diol and a mixture of dimethyl esters of $HOOC(CH_2)_nCOOH$ diacids The materials used for the synthesis of oligoester diols were as follows. Dimethyl azelate was obtained from Aldrich and redistilled, the distilled diester was composed of dimethyl esters of heptanedioic (1.8%), octanedioic (4.1%), azelaic (83.6%), decanedioic (3.5%) and undecanedioic (7.1%) acids, as determined by GC/MS. Dimethyl glutarate and dimethyl adipate were obtained from DuPont, as "DBE-5" and "DBE-3", respectively, they are reported to be mixtures of the dimethyl esters of succinic (SA), glutaric (GA), and adipic (AA) acids in the following proportions:
DBE-3: SA, <1%; GA, 5–15%; AA, 85–95%;
DBE-5: dimethyl glutarate >98.5%.
DBE-3 and DBE-5 are liquids at 25° C. and solids at 0° C. 1,4-butanediol (99%) and zinc acetate dihydrate (98%) were obtained from Aldrich Chemical Co.

In a 500-mL four-neck flask equipped with stirrer, Dean-Stark trap, condenser, thermometer and nitrogen inlet, were placed dimethyl azelate (108 g., 0.5 mol), DBE-3 (87 g., 0.5 mol), DBE-5 (80 g., 0.5 mol), 1,4-butanediol (270 g., 3.0 mol), zinc acetate dihydrate (1.09 g., 0.2% of total reactant weight). The stirred mixture was heated by an electrothermal heating mantle with a controller from 150° C. to 170° C. for 3 hours, and then heated to 200° C. and maintained for 1 hour. About 95% of the theoretical amount of methanol, the by-product of the transesterification, was collected in the Dean-Stark trap. The temperature was raised from 200° C. to 220° C., and nitrogen was fed slowly through the reactants to remove 1,4-butanediol, the by-product of the co-polycondensation. Oligoester-diols with different molecular weights were obtained by removing samples at different intervals.
B. Synthesis of Blocked-Polyisocyanate Desmodur N3300 (obtained from Miles Corporation) is a cyclo-trimer of 1,6-hexamethylene diisocyanate (isocyanurate of 1,6-hexamethylene diisocyanate, HDI). Its viscosity is 1.8–4 mPa.s at 25° C., and its equivalent weight is 194. Acetone oxime, 98% and methanol used as blocking agents for polyisocyanates were obtained from Aldrich Chemical Company.

Methanol-blocked polyisocyanate of Desmodur N3300 (M-b-D) was prepared by reacting Desmodur N3300 with an excess of methanol at reflux temperature (about 60°–65° C.) for 6 hours, stirring with a magnetic bar and without catalyst under a flux of dried nitrogen. Excess methanol was removed under vacuum at room temperature. The residue was characterized and used without further purification.

Acetone oxime-blocked-isocyanate of Desmodur N3300 (A-b-D) was prepared in the same procedures as that for M-b-D, except only using an equivalent weight of acetone oxime as blocking agent and ethyl acetate as solvent instead of methanol. The reaction is shown below:

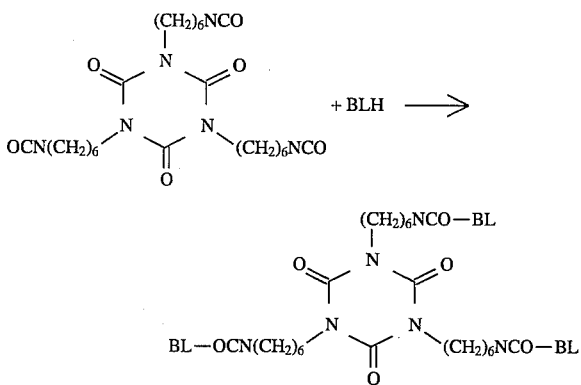

BLH: $CH_3OH$, or $(CH_3)_2C-N-OH$.

Both of the products are viscous liquids without —N=C=O groups, as proved by the absence of the —N=C=O peak at $2260\ cm_{-1}$, in the IR-spectra C. Formulations of Oligoester-diols with Acetone-Oxime Blocked Polyisocyanate and Water 1. Materials and Techniques used in this and other Examples.

The paints were prepared by blending oligoester-diol, crosslinker, levelling additive catalyst, and water together.

Dibutyltin dilaurate (DBTDL) 98% and dibutyltin diacetate (DBTDA) technical grade, used as curing catalyst when blocked-polyisocyanate was used as crosslinker, were obtained from Aldrich Chemical Company. Defoamer BYK-077 and leveling additive BYK-358 were obtained from BYK Chemie. Titanium dioxide R700 was obtained from DuPont Chemicals.

Panels for painting tests were purchased from Q-Panel Company, including Q-PHOS R-36-1, a phosphated steel panel (3×6×0.032 inches) and Q-Panel R-36, an untreated steel panel (3×6×0.032 inches).

Films were prepared by casting the blended solution on panel by a 26# wire-wound draw bar and baking in an oven at 150° C. for 30 minutes unless otherwise stated.

Pencil hardness was measured according to ASTMD3364-74 standard test method for film hardness by pencil test. Impact resistance, either direct or reverse impact, was measured according to the ASTM D2794-84 standard test method for resistance of organic coatings to the effects of rapid deformation (Impact). Resistance to methyl-ethyl-ketone (MEK) was measured by double rubbing with MEK saturated nonwoven paper ("Kim-Wipe"). The nonwoven paper was kept saturated by MEK during the measurement.

Dry film thickness was measured by an Elcometer Model 300 thickness gauge. Adhesion was measured according to ASTM standard (Designation: D3359-87, test method B-cross-cut tape test). VOC and NVW were measured according to ASTM standard test method for volatile content of coatings (Designation D2369-87). Viscosity was measured on a Brookfield viscometer at 5 rpm except as noted.

2. Properties of Formulations

Properties of formulations with acetone-oxime blocked polyisocyanate are shown in Table 1.

TABLE 1

| Oligoester diol $M_n$ wt (g)/meq. wt | 300 2.0/13.33 | 300 2.0/13.33 | 520 2.0/7.7 | 520 2.0/7.7 |
|---|---|---|---|---|
| Crosslinker wt (g)/meq. wt | A-b-D 3.2/13.33 | A-b-D 3.2/13.33 | A-b-D 2.23/9.24 | A-b-D 2.23/9.24 |
| BYK-358* | 0.025/0.5% | 0.025/0.5% | 0.022/0.5% | 0.022/0.5% |
| Catalyst* | DBTDL | DBTDL | DBTDL | DBTDL |
| Added $H_2O$* | 0.25/5% | 0.50/10% | 0.22/5% | 0.44/10% |
| Baking | 150° C./30 | 150° C./30 | 150° C./30 | 150° C./30 |
| Panel | Q-PHOS R-36-1 | Q-PHOS R-36-1 | Q-PHOS R-36-1 | Q-PHOS R-36-1 |
| Film thick. (mil) | 1.2 | 1.0–1.2 | 0.9–1.2 | 0.9–1.2 |
| Direct Impact (Lb/in.) | 160 | 160 | 160 | 160 |
| Reverse Impact (Lb/in.) | 160 | 160 | 160 | 140 |
| Pencil Hardness | 4H–5H | 4H–5H | 4H | 4H |
| MEK Rub Resistance | >200 | >200 | >200 | >200 |
| Adhesion | 5B | 5B | 5B | ≈5B |
| Appearance | Very little sticky and a little yellowish | as left | A little sticky and a little yellowish | as left |

*Percentage of total weight.

EXAMPLE II

Formulation of Mixtures of Oligoester-Diols, Polyurethane Diol and Melamine Resin with Water A series of oligoester-diols with different molecular weights were prepared as described in Example I.

K-FLEX UD320-100 was a 100% polyurethane-diol with hydroxyl equivalent weight 160, and viscosity 7.0 Pa.s at 50° C. K-FLEX UD-320W, having the same structure as K-FLEX UD320-100, was a polyurethane-diol containing about 10% by weight of water with a hydroxyl equivalent weight of 178, and viscosity of 8.0 Pa.s at 25° C. Both were obtained from King Industries.

Cymel 1135, a 50/50 methylated/butylated melamine with >70% monomeric content, was obtained from Cytec Company. Resimene 797, a modified methylated melamine containing 20% of a polyol, and Resimene HM2612, 100% methylated melamine with >90% monomeric content, were obtained from Monsanto Chemical Company.

Catalyst Dinonyl naphthalene disulfonic acid (DNNDSA) in isobutanol was obtained from King Industries ("Nacure-155").

Dispersant Solsperse 24000, a polyester/polyamine copolymer with m.p. of 47.5° C. was obtained from United Color Technology, Inc.

Additives, BYK-077, BYK-358, pigment $TiO_2$, and panels were the same as those described in Example I.

Procedures for preparing and testing the formulations were similar to those described in Example I. Hardeners were dissolved in the oligoester-diol—melamine resin blend at 150° C. along with a "Hyperdispersant" stabilizer, Solsperse 24000, and then cooled with stirring to give a dispersion of fine particles. After cooling, catalyst was added and the dispersions were cast as a film and baked at 150° C. for 30 minutes except as noted.

The properties of formulations with added water are described in Table 2.

TABLE 2

Formulation of Oligoester-diol with Different Amount of Added Water.

| Oligoester diol $M_n$ (I) | 840 | 840 | 840 | 840 |
|---|---|---|---|---|
| wt (g)/meq. wt | 9.0/21.42 | 9.0/21.42 | 9.0/21.42 | 9.0/21.42 |
| Oligoester diol $Mn_n$ (II) | 1600 | 1600 | 1600 | 1600 |
| wt (g)/meq. wt | 6.0/7.5 | 6.0/7.5 | 6.0/7.5 | 6.0/7.5 |
| Oligoester dil $M_n$ (III) | 300 | 300 | 300 | 300 |
| wt (g)/meq. wt | 6.0/40.0 | 6.0/40.0 | 6.0/40.0 | 6.0/40.0 |
| K-FLEX UD320W wt (g)/meq. wt | 9.0/50.6 | 9.0/50.6 | 9.0/50.6 | 9.0/50.6 |
| Cymel 1135 wt (g)/meq. wt | 16.44/ 191.2 | 16.44/ 191.2 | 16.44/ 191.2 | 16.44/ 191.2 |
| BYK-358* | 0.5% | 0.5% | 0.5% | 0.5% |
| DNNDSA* | 1% | 1% | 1% | 1% |
| $H_2O$* (total) | 1.9% | 5.0% | 10.0% | 15.0% |
| in UD320W | 1.9% | 1.9% | 1.9% | 1.9% |
| added water | — | 3.1% | 8.1% | 13.1% |
| Viscosity mPa · s/6 @ 25° C. | 1425 | 1225 | 1160 | 1500 |
| Behavior of Solution | Transparent | A little hazy | Translucent | Hazy |
| Panel | Q-PHOS | Q-PHOS | Q-PHOS | Q-PHOS |
| Film thick. | 0.9–1.0 | 1.1–1.2 | 0.8–1.1 | 0.9–1.2 |
| Direct Impact (Lb/in.) | 60 | 60 | 60 | 60 |
| Reverse Impact (Lb/in.) | ≈20 | ≈20 | ≈20 | ≈20 |
| Pencil Hardness | 4H | 3H | 3H | 3H |
| MEK Rub Resistance | >200 | >200 | >200 | >200 |
| Adhesion | ≈2B | 2B–3B | 2B–3B | 3B |
| Appearance | Transparent | as left | as left | as left |

*Percentage of total weight.

EXAMPLE III

Formulation of Oligoester-Diol, Polyurethane Diol, Melamine Resin and Polyisocyanate with Water A series of oligoester-diols with different molecular weights were prepared as indicated in Example I. Cymel 1135, K-FLEX UD-320W, and catalyst DNNDSA are described in Example II. Acetone oxime blocked Desmodur N3300 (A-b-D) and catalyst DBTDL are described in Example I.

Desmodur BL-3175A, a blocked aliphatic polyisocyanate based on the reaction of hexamethylene diisocyanate (HDI) with blocking agent methyl ethyl ketoxime (MEKO) and dissolved in "Aromatic 100," is obtained from Miles Corporation. The content of MEKO-blocked HDI polymer is 75%, the equivalent weight is 370, and the viscosity is 2000–4000 mPa.s at 23° C.

Procedures for preparing and testing the formulation were the same as those described in Examples I and II.

TABLE 3

Formulations of Oligoester-diols with Melamine Resin and Acetone Oxime-Blocked-Desmodur N3300 (A-b-D).

| Oligoester-diol $M_n$ | 735 | 735 | 735 |
|---|---|---|---|
| wt. (g)/meq. wt | 1.0/2.72 | 1.0/2.72 | 1.0/2.72 |
| Cymel 1135 wt (g)/meq. wt | 1.09/12.66 | 1.09/12.66 | 1.09/12.66 |
| eq wt ratio of Melamine/diol | 1.5/1 | 1.5/1 | 1.5/1 |
| K-FLEX UD320W MW | 320 | 320 | 320 |
| wt (g)/meq. wt | 1.0/5.62 | 1.0/5.62 | 1.0/5.62 |
| A-b-D wt (g) meq. wt. | 0.51/2.11 | 1.51/2.11 | 0.51/2.11 |
| eq. wt. ratio of A-b-D/diols | 0.3/1 | 0.3/1 | 0.3/1 |
| BYK-358* | 0.5% | 0.5% | 0.5% |
| DNNDSA* | 1% | 1% | 1% |
| DTBDL* | 0.5% | 0.5% | 0.5% |
| Added Water* | — | 5% | 10% |
| Baking Temp °C./Time (minute) | 150/30 | 150/30 | 150/30 |
| Panel | Q-PHOS R-36-1 | Q-PHOS R-36-1 | Q-PHOS R-36-1 |
| Film thick. (mil) | 1.0–1.2 | 1.0 | 0.6–0.8 |
| Direct Impact (Lb/in.) | 60 | 60 | 60 |
| Reverse Impact (Lb/in.) | 20 | ≈20 | ≈20 |
| Pencil Hardness | 4H | 4H | 4H |
| MEK Rub Resistance | >200 | >200 | >200 |
| Adhesion | ≈3B | ≈2B | ≈2B |
| Appearance | Transparent | Transparent | Transparent |

*Percentage of total weight.

TABLE 4

Formulations of Oligoester-diols with Melamine Resin and Acetone Oxime-Blocked-Desmodur N3300 (A-b-D).

| Oligoester-diol $M_n$ | 735 | 735 | 735 |
|---|---|---|---|
| wt. (g)/meq. wt | 1.0/2.72 | 1.0/2.72 | 1.0/2.72 |
| Cymel 1135 wt (g)/meq. wt | 1.09/12.66 | 1.09/12.66 | 1.09/12.66 |
| eq wt ratio of Melamine/diol | 1.5/1 | 1.5/1 | 1.5/1 |
| K-FLEX UD320W MW | 320 | 320 | 320 |
| wt (g)/meq. wt | 1.0/5.62 | 1.0/5.62 | 1.0/5.62 |
| A-b-D wt (g) mew. wt. | 1.02/4.22 | 1.02/4.22 | 1.02/4.22 |
| eq. wt. ratio of A-b-D/diols | 0.5/1 | 0.5/1 | 0.5/1 |
| BYK-358* | 0.5% | 0.5% | 0.5% |
| DNNDSA* | 1% | 1% | 1% |
| DBTDL* | 0.5% | 0.5% | 0.5% |
| Added Water* | — | 5% | 10% |
| Baking Temp °C./Time (minute) | 150/30 | 150/30 | 150/30 |
| Panel | Q-PHOS R-36-1 | Q-PHOS R-36-1 | Q-PHOS R-36-1 |
| Film thick. (mil) | 1.2–1.4 | 0.8–1.2 | 1.4–1.6 |
| Direct Impact (Lb/in.) | 60 | 80 | 40 |
| Reverse Impact (Lb/in.) | 20 | ≈60 | 30 |
| Pencil Hardness | 4H | 4H | 4H |
| MEK Rub | >200 | >200 | >200 |

TABLE 4-continued

Formulations of Oligoester-diols with Melamine Resin and Acetone Oxime-Blocked-Desmodur N3300 (A-b-D).

| Resistance Adhesion | 3B | 3B–4B | 2B–3B |
|---|---|---|---|
| Appearance | Transparent | Transparent | Transparent |

*Percentage of total weight.

TABLE 5

Formulations of Oligoester-diols with Melamine Resin and Acetone Oxime-Blocked-Desmodur N3300 (A-b-D).

| Oligoester-diol $M_n$ | 735 | 735 | 735 |
|---|---|---|---|
| wt. (g)/meq. wt | 1.0/2.72 | 1.0/2.72 | 1.0/2.72 |
| Cymel 1135 wt (g)/meq. wt | 0.54/6.331 | 0.54/6.33 | 0.54/6.33 |
| eq wt ratio of Melamine/diol | 0.75/1 | 0.75/1 | 0.75/1 |
| K-FLEX UD320W MW | 320 | 320 | 320 |
| wt (g)/meq. wt | 1.0/5.62 | 1.0/5.62 | 1.0/5.62 |
| A-b-D wt (g) mew. wt. | 1.02/4.22 | 1.02/4.22 | 1.02/4.22 |
| eq. wt. ratio of A-b-D/diols | 0.5/1 | 0.5/1 | 0.5/1 |
| BYK-358* | 0.5% | 0.5% | 0.5% |
| DNNDSA* | 1% | 1% | 1% |
| DBTDL* | 0.5% | 0.5% | 0.5% |
| Added Water* | — | 5% | 10% |
| Baking Temp °C./Time (minute) | 150/30 | 150/30 | 150/30 |
| Panel | Q-PHOS R-36-1 | Q-PHOS R-36-1 | Q-PHOS R-36-1 |
| Film thick. (mil) | 1.0 | 0.9 | 1.0 |
| Direct Impact (Lb/in.) | 160 | 160 | 160 |
| Reverse Impact (Lb/in.) | 160 | 160 | 160 |
| Pencil Hardness | 4H | 4H | 4H |
| MEK Rub Resistance | >200 | >200 | >200 |
| Adhesion | 5B | 5B | 5B |
| Appearance | Transparent | Transparent | Transparent |

*Percentage of total weight.

TABLE 6

Formulations of Oligoester-diols with Melamine Resin and Acetone Oxime-Blocked-Desmodur N3300 (A-b-D).

| Oligoester-diol $M_n$ | 735 | 735 | 735 |
|---|---|---|---|
| wt. (g)/meq. wt | 8.0/21.77 | 8.0/21.77 | 8.0/21.77 |
| Cymel 1135 wt (g)/meq. wt | 5.24/60.93 | 5.24/60.93 | 5.24/60.93 |
| eq wt ratio of Melamine/diol | 0.91/1 | 0.91/1 | 0.91/1 |
| K-FLEX UD320W MW | 320 | 320 | 320 |
| wt (g)/meq. wt | 8.0/44.94 | 8.0/44.94 | 8.0/44.94 |
| A-b-D wt (g) mew. wt. | 6.12/25.38 | 6.12/25.38 | 6.12/25.38 |
| eq. wt. ratio of A-b-D/diols | 0.38/1 | 0.38/1 | 0.38/1 |
| BYK-358* | 0.5% | 0.5% | 0.5% |
| DNNDSA* | 1% | 1% | 1% |
| Water* (total) in UD-320W | 3% 3% | 8% 3% | 13% 3% |
| added | — | 5% | 10% |
| Viscosity cps/6 rpm @ 25° C. | — | 2510 | 1410 |
| Baking Temp °C./Time (minute) | 150/30 | 150/30 | 150/30 |
| Panel | Q-PHOS R-36-1 | Q-PHOS R-36-1 | Q-PHOS R-36-1 |
| Film thick. mil | 1.4 | 1.4 | 1.4 |
| Direct Impact (Lb/in.) | 160 | 160 | 160 |
| Reverse Impact (Lb/in.) | 160 | 160 | 160 |
| Pencil Hardness | 4H–5H | 4H–5H | 4H–5H |
| MEK Rub Resistance | >200 | >200 | >200 |
| Adhesion | 5B | 5B | 5B |
| Appearance | a little yellowish | a little yellowish | a little yellowish |

*Percentage of total weight.

TABLE 7

Formulations of Oligoester-diols with Melamine Resin and Acetone Oxime-Blocked-Desmodur N3300 (A-b-D).

| Oligoester-diol $M_n$ | 840 | 840 | 840 |
|---|---|---|---|
| wt. (g)/meq. wt | 6.0/14.28 | 6.0/14.28 | 6.0/14.28 |
| Cymel 1135 wt (g)/meq. wt | 4.13/48.0 | 4.13/48.0 | 4.13/48.0 |
| Melamine diol** | 1.0/1.0 | 1.0/1.0 | 1.0/1.0 |
| K-FLEX UD320W MW | 320 | 320 | 320 |
| wt (g)/meq. wt | 6.0/33.71 | 6.0/33.71 | 6.0/33.71 |
| A-b-D wt (g) meq. wt. | 3.46/14.4 | 3.46/14.4 | 3.46/14.4 |
| A-b-D/diols | 0.30/1 | 0.30/1 | 0.30/1 |
| BYK-358* | 0.5% | 0.5% | 0.5% |
| DNNDSA* | 1% | 1% | 1% |
| Water* (total) in UD-320W | 3% 3% | 8% 3% | 13% 3% |
| added | — | 5% | 10% |
| Viscosity cps/6 rpm @ 25° C. | 5859 (3 rpm) | 2495 | 1540 |
| VOC* (110° C., 1 h.) | 6.8% | 2.1% | 1.0% |
| Baking Temp °C./Time (minute) | 150/30 | 150/30 | 150/30 |
| Loss Weight* (after baking) | 17.5% | 16.4% | 14.7% |
| Panel | Q-PHOS R-36-1 | Q-PHOS R-36-1 | Q-PHOS R-36-1 |
| Film thick. mil | 1.0/1.1 | 1.1/1.2 | 1.1/1.2 |
| Direct Impact (Lb/in.) | 140 | 140 | 140 |
| Reverse Impact (Lb/in.) | ≈120 | 120 | 120 |
| Pencil Hardness | 3H–4H | 3H–4H | 2H–2H |
| MEK Rub Resist. | >200 | >200 | >200 |
| Adhesion | 5B | 5B | 5B |
| Appearance | a little yellowish | a little yellowish | a little yellowish |

*Percentage of total weight.
**Equivalent weight ratio.

TABLE 8

Formulations of Oligoester-diols with Melamine Resin and Acetone Oxime-Blocked-Desmodur N3300 (A-b-D).

| Oligoester-diol $M_n$ | 520 | 520 | 520 |
|---|---|---|---|
| wt. (g)/meq. wt | 6.0/23.08 | 6.0/23.08 | 6.0/23.08 |
| Cymel 1135 wt (g)/meq. wt | 4.88/56.8 | 4.88/56.8 | 4.88/56.8 |
| Melamine diol** | 1.0/1.0 | 1.0/1.0 | 1.0/1.0 |
| K-FLEX UD320W MW | 320 | 320 | 320 |
| wt (g)/meq. wt | 6.0/33.71 | 6.0/33.71 | 6.0/33.71 |
| A-b-D wt (g) | 4.11/17.04 | 4.11/17.04 | 4.11/17.04 |

TABLE 8-continued

Formulations of Oligoester-diols with Melamine Resin and Acetone Oxime-Blocked-Desmodur N3300 (A-b-D).

| meq. wt. A-b-D/diols | 0.30/1 | 0.30/1 | 0.30/1 |
|---|---|---|---|
| BYK-358* | 0.5% | 0.5% | 0.5% |
| DNNDSA* | 1% | 1% | 1% |
| Water* (total) | 3% | 8% | 13% |
| in UD-320W | 3% | 3% | 3% |
| added | — | 5% | 10% |
| Viscosity cps/6 rpm @ 25° C. | 4219 | 1495 | 810 |
| Baking Temp °C./ Time (minute) | 150/30 | 150/30 | 150/30 |
| Panel | Q-PHOS R-36-1 | Q-PHOS R-36-1 | Q-PHOS R-36-1 |
| Film thick. mil | 1.1–1.2 | 1.0–1.1 | 1.0 |
| Direct Impact (Lb/in.) | 120 | 140 | ≈100 |
| Reverse Impact (Lb/in.) | ≈80 | ≈100 | ≈120 |
| Pencil Hardness | 3H–4H | 3H–4H | 3H–4H |
| MEK Rub Resist. | >200 | >200 | >200 |
| Adhesion | 5B | 5B | 5B |
| Appearance | very little yellowish | very little yellowish | very little yellowish |

*Percentage of total weight.
**Equivalent weight ratio.

TABLE 9

Formulations of Oligoester-diols with Mixed Crosslinkers of Melamine Resin and Desmodur BL-3175A and Water.

| Oligoester-diol $M_n$ | 520 | 520 | 520 |
|---|---|---|---|
| wt. (g)/meq. wt | 10.0/38.46 | 10.0/38.46 | 10.0/38.46 |
| K-FLEX UD-320w wt (g)/meq. wt | 10.0/56.17 | 10.0/56.17 | 10.0/56.17 |
| Cymel 1135 wt (g)/meq. wt | 8.14/94.63 | 8.14/94.63 | 8.14/94.63 |
| meq. wt. ratio* | 1.0 | 1.0 | 1.0 |
| Desmodur BL-3175A wt. (g)/meq. wt. | 7.0/18.93 | 7.0/18.93 | 7.0/18.93 |
| meq. wt. ratio* | 0.20 | 0.20 | 0.20 |
| BYK-358** | 0.5% | 0.5% | 0.5% |
| DNNDSA** | 0.5% | 0.5% | 0.5% |
| Water in K-FLEX UD320 w (%) | 2.8 | 2.8 | 2.8 |
| added water (%) | 0 | 2.2 | 7.2 |
| total (%) | 2.8 | 5.0 | 10.0 |
| Viscosity cps/6 rpm @ 25° C. | 1310 | 1045 | 740 |
| VOC** (110° C., 1 hour) | 13.4% | 7.8% | 5.8% |
| Baking Temp °C./ Time (minute) | 140/30 | 140/30 | 140/30 |
| Loss Weight* (after baking) | 21.7% | 23.6% | 28.5% |
| Film thick. mil | 0.8–0.9 | 0.8–0.9 | 0.8–0.9 |
| Direct Impact (Lb/in.) | 160 | 160 | 160 |
| Reverse Impact (Lb/in.) | 160 | 160 | 160 |
| Pencil Hardness | 4H | 4H | 4H |
| MEK Rub Resist. | >200 | >200 | >200 |
| Adhesion | 5B | 4B–5B | 4B |
| Appearance | transparent | a little yellowish | a little yellowish |

*The ratio of melamine to total diols.
**Percentage of total weight.

EXAMPLE IV

Formulation of Oligoester-Diol, Mixtures of Polyurethane Diols, Melamine Resin and Blocked Polyisocyanate with Water A. Oligoester Diols A series of oligoester-diols with different molecular weights was prepared as indicated in Example I.

B. Synthesis of Polyurethane Diol

Polyurethane diol K-FLEX UD-320W, as described in Example I, and a polyurethane diol as synthesized below were used in the formulations. Synthesis of polyurethane diol was as follows.

27.8 g. (0.125 mol) of IPDI (isophorone diisocyanate) and 112.5 g. (1.25 mol) of 1,4-butanediol were placed in a 250-mL, 3-necked flask and heated at 60° C. with stirring for eight hours. After the reaction, the solution was washed with water twice, separating with a separation funnel, and then 33.0 g. of toluene was added. Finally toluene was taken off with remaining water under vacuum in a rotary evaporator.

C. Synthesis of Blocked Isocyanate

In a 250-mL, 3-necked flask equipped with a magnetic stirrer, a condenser and a thermometer were placed 63.0 g (0.125 mol) of HDI-biuret (Desmondur N3300), 32.7 g (0.375 mol) of 2-Butanone oxime and 88.1 g of ethyl acetate. After about 30 minutes, the mixture was heated to 60° C. for 7–8 hours. Then ethyl acetate was taken off in a rotary evaporator.

D. Formulations

Melamine HM-2612 was obtained from Monsanto Chemical Company. HM-2612 is a highly monomeric, highly methylolated hexamethylolated melamine formaldehyde resin. Under most conditions, it appears to be solid at 25° C. Additive BYK-301 was obtained from BYK Corporation. Catalyst DNNDSA is described in Example II.

Oligoester-diols, polyurethane-diols, blocked isocyanate, melamine resin and leveling agent were blended at 50° C. with stirring until homogeneous, and cooled to room temperature. Catalyst (DNNDSA) was added with stirring. When water-thinned coatings were made without co-solvents, the water was added with stirring before the catalyst was added.

Other procedures for preparing and testing the formulations were similar to those described in Example I.

Formulations and properties are set forth in Tables 10–14.

TABLE 10

Different Amount of Melamine in Oligoester diol and Polyurethanediol System

| Oligoester-diol MW | 500 | 500 | 500 |
|---|---|---|---|
| wt. (g)/meq. wt | 3/12 | 3/12 | 3/12 |
| K-FLEX UD-320W wt (g)/ meq. wt. | 3/16.85 Solids (2.7 g) | 3/16.85 as left | 3/16.85 as left |
| Polyurethane-diol* wt (g)/meq. wt. | 1.74/8.63 | 1.74/8.63 | 1.74/8.63 |
| Melamine HM-2612 wt (g)/meq. wt. | 2.67/141.08 | 2.43/37.38 | 2.19/33.69 |
| BYK-301 0.2% | 0.0208 (g) | 0.0203 (g) | 0.0199 (g) |
| DNNDSA | 0.0521 (g) | 0.0509 (g) | 0.0497 (g) |
| Water in UD-320W | 0.3 g. 2.9% | 0.3 g. 2.9% | 0.3 g. 3.0% |
| Panel | Q-PHOS R-36-1 | Q-PHOS R-36-1 | Q-PHOS R-36-1 |
| Direct Impact (Lb/in.) | 120 | 120 | 120 |

TABLE 10-continued

Different Amount of Melamine in Oligoester diol and Polyurethanediol System

| | | | |
|---|---|---|---|
| Reverse Impact (Lb/in.) | 120*** | 140** | 140** |
| Pencil Hardness | 3H | 3H | 3H |
| Adhesion | 3B–4B | 4B–5B | 5B |
| MEK Rub Resistance | 200 | 200 | 200 |
| Film thickness | 0.9–1.1 | 1.0–1.2 | 1.15–1.2 |
| NVW (110° 1 hr) | 91.0% | 90.0% | 89.0% |
| Appearance | transparent | transparent | transparent |

*IPDI reacted with 1,4 butanediol 99%.
**Panels cracked after about 10 days.
***Panels cracked after about 20 days.

TABLE 11

Different Amount of Water in Oligoester diol/polyurethane diol/Melamine System

| | | | | |
|---|---|---|---|---|
| Oligoester-diol MW | 300 | 300 | 300 | 300 |
| wt. (g)/meq. wt | 10/63.90 | 10/63.90 | 10/63.90 | 10/63.90 |
| K-FLEX UD-320W | 10/56.18 | 10/56.18 | 10/56.18 | 10/56.18 |
| wt (g)/meq. wt. | Solids 9 g | as left | as left | as left |
| Polyurethane-diol* | 7.25/36.02 | 7.25/36.02 | 7.25/36.02 | 7.25/36.02 |
| wt (g)/meq. wt. | | | | |
| Melamine HM-2612 | 9.13/140.5 | 9.13/140.5 | 9.13/140.5 | 9.13/140.5 |
| wt (g)/meq. wt. | | | | |
| BYK-301 0.3% | 0.11 g | 0.11 g | 0.11 g | 0.11 g |
| DNNDSA | 0.18 g | 0.18 g | 0.18 g | 0.18 g |
| Water % added | 0 | 5 | 10 | 15 |
| water in UD-320W | 1 g | 1 g | 1 g | 1 g |
| total % | 2.7% | 7.4% | 11.6% | 15.44% |
| Viscosity, Pa · s (25° C., 2 sec⁻¹) | 2.1 | 0.82 | 0.45 | 0.35 |
| Panel | Q-PHOS R-36-1 | Q-PHOS R-36-1 | Q-PHOS R-36-1 | Q-PHOS R-36-1 |
| Direct Impact (Lb/in.) | 120 | 120 | 120 | 120 |
| Reverse Impact (Lb/in.) | 120 | 120 | 120 | 120 |
| Pencil Hardness | 4H | 4H | 4H | 4H |
| Adhesion | 5B | 5B | 4B | 4B |
| MEK Rub Resist. | 200 | 200 | 200 | 200 |
| NVW (110° 1 hr) | | | 83.41% | 82.30% |
| Film thickness | 1.05–1.2 | 0.85–1.0 | 1.0–1.2 | 1.1–1.2 |
| Appearance | transparent | transparent | transparent | transparent |

*IPDI reacted with 1,4 butanediol 99%.

TABLE 12

Different Ratios of Blocked Isocyanate and Melamine in Oligoester Diol/Polyurethane Diol/Blocked Isocyanate/Melamine System

| | | | |
|---|---|---|---|
| Oligoester-diol MW | 313 | 313 | 313 |
| wt. (g)/meq. wt | 3/19.17 | 3/19.17 | 3/19.17 |
| K-FLEX UD-320W | 3/16.85 | 3/16.85 | 3/16.85 |
| wt (g)/meq. wt. | Solids 2.7 g | as left | as left |
| Blocked Isocyanate wt (g)/meq. wt. | 2.76/10.81 | 2.30/9.01 | 1.84/7.21 |
| Melamine HM-2612 wt (g)/meq. wt. | 2.13/32.79 | 2.28/35.13 | 2.44/37.47 |
| BYK-301 0.3% | 0.0327 (g) | 0.0317 (g) | 0.0308 (g) |
| DNNDSA 0.5% | 0.0544 (g) | 0.0529 (g) | 0.0514 (g) |
| Water in UD-320W | 0.3 g | 0.3 g | 0.3 g |
| | 2.8% | 2.8% | 2.9% |
| NVW (110° 1 hr) | 89.0% | 88.0% | 88.0% |

TABLE 12-continued

Different Ratios of Blocked Isocyanate and Melamine in Oligoester Diol/Polyurethane Diol/Blocked Isocyanate/Melamine System

| Panel | Q-PHOS R-36-1 | Q-PHOS R-36-1 | Q-PHOS R-36-1 |
|---|---|---|---|
| Direct Impact (Lb/in.) | 120 | 160 | 160 |
| Reverse Impact (Lb/in.) | 80** | 120*** | 100*** |
| Pencil Hardness | 3H | 3H | 3H |
| Adhesion | 5B | 5B | 5B |
| MEK Rub Resistance | 200 | 200 | 200 |
| Film thickness | 1.05–1.3 | 1.1–1.2 | 1.2–1.4 |
| Appearance | transparent | transparent | transparent |

**Panel cracked after about one day.
***Panel cracked after four days.

TABLE 13

Different Amount of Water in Oligoester Diol/Blocked Isocyanate/Melamine System

| | | | | |
|---|---|---|---|---|
| Oligoester-diol MW | 313 | 313 | 313 | 313 |
| wt. (g)/meq. wt | 10/63.90 | 10/63.90 | 10/63.90 | 10/63.90 |
| K-FLEX UD-320W | 10/56.18 | 10/56.18 | 10/56.18 | 10/56.18 |
| Polyurethane wt (g)/meq. wt. | Solids 9 g | as left | as left | as left |
| Blocked Isocyanate wt (g)/meq. wt. | 7.66/30.02 | 7.66/30.02 | 7.66/30.02 | 7.66/30.02 |
| Melamine HM-2612 wt (g)/meq. wt. | 7.6/117.08 | 7.6/117.08 | 7.6/117.08 | 7.6/117.08 |
| BYK-301 0.3% | 0.1058 | 0.1058 | 0.1058 | 0.1058 |
| DNNDSA 0.5% | 0.1764 | 0.1764 | 0.1764 | 0.1764 |
| Water % added | 0 | 5 | 10 | 15 |
| water in UD-320W | 1 g | 1 g | 1 g | 1 g |
| total % | 2.8% | 7.5% | 11.7% | 15.5% |
| Viscosity, Pa · s (25° C., 2 sec⁻¹) | 2.11 | 1.06 | 0.57 | 0.42 |
| Panel | Q-PHOS R-36-1 | Q-PHOS R-36-1 | Q-PHOS R-36-1 | Q-PHOS R-36-1 |
| Direct Impact (Lb/in.) | 140 | 120 | 120 | 120 |
| Reverse Impact (Lb/in.) | 100** | 120** | 120** | 60 |
| Pencil Hardness | 3H | 3H | 3H | 3H |
| Adhesion | 5B | 5B | 5B | 4B |
| MEK Rub Resist. | 200 | 200 | 200 | 200 |
| Film thickness | 1.4 | 0.9–1.0 | 1.6–2.0 | 1.0–1.2 |
| NVW (110° C. 1 hr) | — | — | 85.8% | 81.9% |
| Appearance | transparent | transparent | transparent | transparent |

**It failed after one night.

TABLE 14

Formulation for spray testing.

| | |
|---|---|
| Oligoester-diol (Mn = 313) wt. (g)/meq. wt. | 80/511.2 |
| Polyurethane-diol wt. (g)/meq. wt. (solids 90%) | K-FLEX UD-320W 80/449.4 |
| Blocked Isocyanate wt. (g)/meq. wt. | 61.27/240.2 |
| Melamine Resin HM 2612 wt. (g)/meq. wt. | HM 2612 60.87/936.5 |
| Added water (12%) | 33.86 (g) |
| Water in UD 320W | 8 (g) |
| Total % | 13.2 |
| BYK-301 0.3% | 0.85 (g) |
| DNNDSA 0.5% | 1.41 (g) |
| Panel | Q-PHOS. R-36-1 |
| Viscosity (Pa.s) (25° C., 2 sec⁻¹) | 0.45 |

TABLE 14-continued

| Formulation for spray testing. | |
|---|---|
| Direct Impact (Lb/in.) | 160 |
| Reverse Impact (Lb/in.) | 100 |
| Pencil hardness | 2H |
| Adhesion | 4B |
| MEK-RUB Resistance | 200 |
| Appearance | Transparent |
| NVW (110° C. 1 hr.) | 80% |
| Film thick | 0.6–0.9 |

EXAMPLE V

Comparison of Formulations of Oligoester Diol of 1,3-Butanediol and 1,4-Butanediol A. Synthesis of Oligoester-diols Oligoester diols of 1,4-butanediol were prepared as indicated in Example I. Oligoester diols of 1,3-butanediol were prepared as follows.

In a 500-mL, four-neck flask equipped with stirrer, Dean-Stark trap, condenser, thermometer and nitrogen inlet were placed dimethyl azelate (108 g, 0.5 mol), DBE-3 (87 g, 0.5 mol), DBE-5 (80 g, 0.5 mol), 1,3-BD (270 g, 3.0 mol), zinc acetate dihydrate (1.09 g, 0.2% of total reactant weight). The stirred mixture was heated by an electrothermal heating mantel with a controller from 150° C. to 160° C. during four hours, then the temperature was raised to 180° C. and maintained for one hour. About 93% of the theoretical amount of methanol, by-product of the transesterification, was collected in the Dean-Stark trap. Then temperature was raised from 180° C. to 215° C., and nitrogen was fed at about 10 mL/minutes through the reactants to remove 1,3-butanediol, the by-product of the co-polycondensation. The liquid oligoester-diols with different molecular weight were obtained by controlling the by-product 1,3-butanediol removed. Therefore, five species of oligoester-diols liquid with methyl side groups were prepared. All were liquid at room temperature.

The reaction involved is shown below.

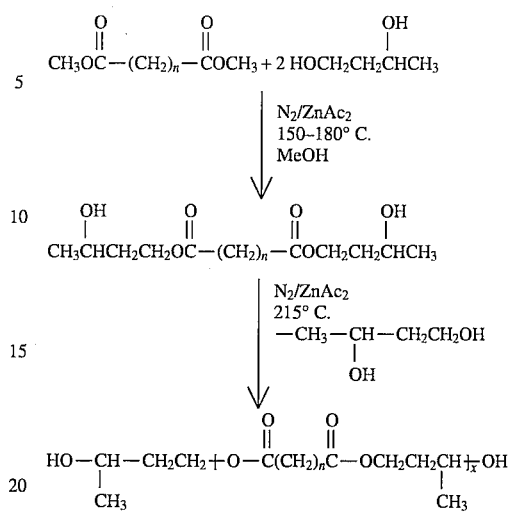

Where n represents 3, 4, and 7. X can be 1, 2 3 . . .

B. Synthesis of Blocked-Polyisocyanates with AY-1 and HDI

AY-1, obtained from Exxon, is a hardener which has phenolic hydroxyls at its two ends. HDI (Desmodur HD 204, obtained from Miles Corporation) is a hexamethylene diisocyanate. Ethyl acetate and propyl acetate were purchased from Aldrich and dried overnight with molecular sieves (4A, ⅛ inch pellets) before use.

In a 500 mL, three-neck flask equipped with condenser, thermometer and dropping funnel, was place AY-1 (35.7 g, 0.105 mol.) and five times its weight of ethyl acetate (175.5 g). The solution was stirred with a magnetic bar as a solution of 0.06 mol. (8.4 g) of HDI in 8.4 g of ethyl acetate was added from the dropping funnel at about 1 drop/second. The solution was stirred at 50° C.–60° C. for eight hours and then kept at room temperature overnight. The temperature was increased to 55° C. for 24 hours, after which IR-spectrum showed a substantial peak at 2250 $cm^{-1}$ for unreacted HDI. The solution was then refluxed (about 77° C.) for 46 hours. Refluxing was discontinued when IR-spectrum showed that the —N=C—O had virtually disappeared.

Using the same equipment and reactants, AY-1 and HDI in propyl acetate reacted to completion in three hours at reflux a temperature of 90° C.

Where propyl acetate is used, the product is referred to as blocked polyisocyanate A-B-H-P, where ethyl acetate is used, the product is referred to at blocked polyisocyanate A-B-H-E.

The reaction is shown below in idealized form:

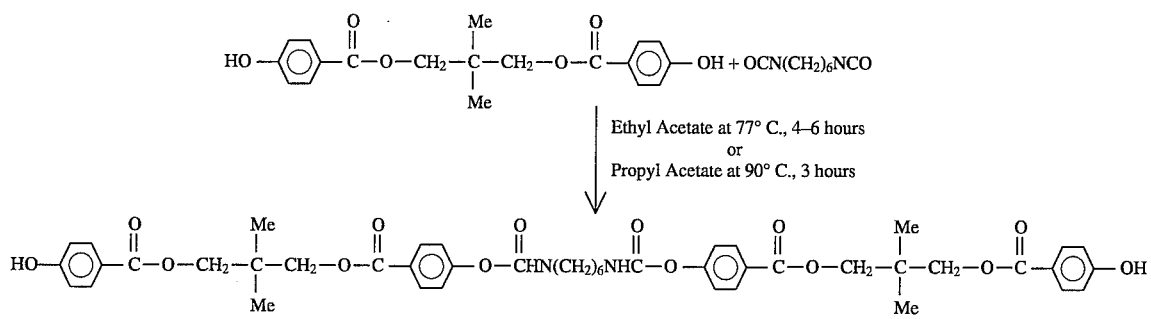

C. Formulations

K-FLEX UD 320, Cymel 1135 DNNDSA, and BYK 358 are described in Example II. Blocked polyisocyanate, Desmodur BL 3175A was obtained from Miles Corporation and has the structure indicated below:

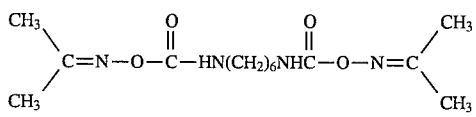

It has a viscosity of 2000–4000 mPa.s at 23° C., an equivalent weight of 370, solvent naphtha (Aromatic 100) 17%, unblocking occurs at about 130° C.

Other properties for preparing and testing the formulations were similar to those described in Example I.

Formulations and properties are set forth in Tables 15–25.

TABLE 15

Comparison of Formulations of 1,3-BD and 1,4-BD with Polyurethane diol, Melamine and Blocked Polyisocyanate.

|  | 1,3-BD | 1,4-BD |
|---|---|---|
| Oligoester-diol (Mn) | 455 | 520 |
| wt. (g)/meq. wt. | 1.0/4.39 | 1.0/3.85 |
| K-FLEX UD 320 | 1.0/5.62 | 1.0/5.62 |
| wt. (g)/meq. wt. |  |  |
| Cymel 1135 | 1.16 | 1.25 |
| meq wt ratio/80% diol |  |  |
| wt. (g)/ meq. wt. | 0.81/ 8.11 | 0.81/7.57 |
| BL 3175A % of total diol | 19% | 20% |
| wt. (g)/meq. wt. | 0.70/1.90 | 0.70/1.90 |
| $H_2O$ % of total weight in UD 320 | 2.82 | 2.82 |
| BYK 358 | 0.018 | 0.018 |
| wt (g)/0.5% of weight |  |  |
| DNNDSA | 0.018 | 0.018 |
| wt (g)/0.5% of weight | 0.018 | 0.018 |
| NVW % | 85.0 | 83.8 |
| Viscosity (2 $sec^{-1}$ 25° C.) | 2550 | 1310* |
| Baking temp/time | 140° C./30 min | 140° C./30 min |
| Film thickness (mil) | 0.8–1.0 | 1.0–1.1 |
| Direct Impact Resistance | 160 | 160 |
| Reverse Impact Resist. | 160 | 160 |
| Pencil hardness | 4H | 4H |
| MEK Rub | >200 | >200 |
| Adhesion | ≈5B | 4B–5B |
| Appearance | Transparent | Transparent |

*Measured at 30.3° C.

TABLE 16

Comparison of Formulations of 1,3-BD and 1,4-BD with Polyurethane diol, Melamine and DNNDSA 0.5%.

|  | 1,3-BD | 1,4-BD |
|---|---|---|
| Oligoester-diol (Mn) | 455 | 520 |
| wt. (g)/meq. wt. | 1.0/4.39 | 1.0/3.85 |
| K-FLEX UD 320 | 1.0/5.62 | 1.0/5.62 |
| wt. (g)/meq. wt. |  |  |
| Cymel 1135 | 1.42 | 1.5 |
| meq wt ratio/80% diol |  |  |
| wt. (g)/meq. wt. | 1.22/14.19 | 1.22/14.19 |
| BYK 358 | 0.016 | 0.016 |
| wt (g)/0.5% of weight |  |  |
| DNNDSA | 0.016 | 0.016 |
| wt (g)/0.5% of weight |  |  |
| $H_2O$ % of total weight in UD 320 | 3.08 | 3.08 |
| NVW % | 91.0 | 90.8 |
| Viscosity (2 $sec^{-1}$ 25° C.) | 2080 | 1570 |
| Baking temp/time | 150° C./30 min | 150° C./30 min |
| Film thickness (mil) | 0.8–1.1 | 0.9–1.0 |
| Direct IMpact Resistance | 100 | 60 |
| Reverse Impact Resist. | ≈80 | ≈40 |
| Pencil hardness | 3H–4H | 3H–4H |
| MEK Rub | >200 | >200 |
| Adhesion | 4B | 3B |
| Appearance | Transparent | Transparent |

TABLE 17

Comparison of Formulations of 1,3-BD and 1,4-BD with Polyurethane diol and Melamine, DNNDSA 1%.

|  | 1,3-BD | 1,4-BD |
|---|---|---|
| Oligoester-diol (Mn) | 455 | 520 |
| wt. (g)/meq. wt. | 1.0/4.39 | 1.0/3.85 |
| K-FLEX UD 320 | 1.0/5.62 | 1.0/5.62 |
| wt. (g)/meq. wt. |  |  |
| Cymel 1135 | 1.42 | 1.5 |
| meq wt ratio/80% diol |  |  |
| wt. (g)/meq. wt. | 1.22/14.19 | 1.22/14.19 |
| BYK 358 | 0.016 | 0.016 |
| wt (g)/0.5% of weight |  |  |
| DNNDSA | 0.032 | 0.032 |
| wt (g)/0.5% of weight |  |  |
| $H_2O$ % of total weight in UD 320 | 3.06 | 3.06 |
| Baking temp/time | 150° C./30 min | 150° C./30 min |
| Film thickness (mil) | 0.8–1.1 | 0.9–1.0 |
| Direct Impact Resistance | 40 | 40 |
| Reverse Impact Resist. | <20 | <20 |
| Pencil hardness | 4H | 4H |
| MEK Rub | >200 | >200 |
| Adhesion | 2B–3B | 0B |
| Appearance | Transparent | Transparent |

TABLE 18

Effect of Catalyst Amounts to Oligoester-diol of 1,3-BD (Mn 350).

| Oligoester-diol MN | 350 | 350 | 350 |
|---|---|---|---|
| wt. (g)/meq. wt | 1.0/5.71 | 1.0/5.71 | 1.0/5.71 |
| K-FLEX UD-320W | 1.0/5.62 | 1.0/5.62 | 1.0/5.62 |
| wt (g)/meq. wt. |  |  |  |
| Cymel 1135 | 1.50 | 1.5 | 1.5 |
| % of total diol |  |  |  |
| wt. (g)/meq. wt. | 1.46/17.0 | 1.46/17.0 | 1.46/17.0 |
| BYK 358 | 0.017/0.5% | 0.017/0.5% | 0.017/0.5% |
| wt (g)/% of wt. |  |  |  |
| DNNDSA | 0.0341/1% | 0.017/0.5% | 0.012/0.35% |
| wt (g)/% of wet. |  |  |  |
| $H_2O$ % of total wt in UD-320W | 2.85 | 2.86 | 2.87 |
| NVW % | 86.0% | 85.0% | 87.0% |
| Viscosity (2 $se^{-1}$ 25° C.) | 2275 | 2275 | 2030 |
| Baking temp/time | 150° C./ 30 min | 150° C./ 30 min | 150° C./ 30 min |
| Direct Impact (Lb/in.) | 40 | 60 | 60 |
| Reverse Impact (Lb/in.) | >20 | >20 | 20 |
| Pencil Hardness | 1B | 1H | 1H |
| Adhesion | 1B–2B | 3B | 4B |
| MEK Rub Resistance | >200 | >200 | >200 |

TABLE 18-continued

Effect of Catalyst Amounts to Oligoester-diol of 1,3-BD (Mn 350).

| FIlm thickness (mil) | 0.8 | 0.7–0.9 | 0.8 |
|---|---|---|---|
| Appearance | transparent | transparent | transparent |

TABLE 19

Effect of Catalyst Amounts to Oligoester-diol of 1,3-BD (Mn 455).

| Oligoester-diol Mn | 455 | 455 | 455 | 455 |
|---|---|---|---|---|
| wt. (g)/meq. wt | 1.0/4.39 | 1.0/4.39 | 1.0/4.39 | 1.0/4.39 |
| K-FLEX UD-320 wt (g)/meq. wt. | 1.0/5.62 | 1.0/5.62 | 1.0/5.62 | 1.0/5.62 |
| Cymel 1135 % of total diol wt (g)/meq. wt. | 1.42 1.22/14.2 | 1.42 1.22/14.2 | 1.42 1.22/14.2 | 1.42 1.22/14.2 |
| BYK 358 - wt. (g) | 0.016 | 0.016 | 0.016 | |
| % of weight | 0.5% | 0.5% | 0.5% | 0.5% |
| DNNDSA - wt. (g) | 0.032 | 0.016 | 0.011 | 0.008 |
| % of weight/ 1% | 0.5% | 0.35% | 0.25% | |
| $H_2O$ % of total wt. in UD 320 | 3.06 | 3.08 | 3.08 | 3.08 |
| Viscosity, Pa.s (25° C., 2 sec$^{-1}$) | — | 2080 | — | — |
| Baking temp/time | 150° C./ 30 min. | 150° C./ 30 min. | 150° C./ 30 min. | 150° C./ 30 min. |
| Direct Impact (Lb/in.) | 40 | 160 | 160* | 140 |
| Reverse Impact (Lb/in.) | <20 | 140* | 140* | 120* |
| Pencil Hardness | 4H | 3H–4H | 1B–1H | 1B–1H |
| Adhesion | 2B–3B | 4B | 2B | 3B |
| MEK Rub Resist. | >200 | >200 | >200 | >200 |
| Film thickness | 0.8/1.1 | 0.8/1.1 | 0.7/1.0 | 0.8/1.2 |
| NVW % | — | 91.0 | — | — |
| Appearance | transparent | transparent | transparent | transparent |

*Failed after one week.

TABLE 20

Effect of Catalyst Amount to Oligoester-diol of 1,3-BD (Mn 560).

| Oligoester-diol MN | 560 | 560 | 560 |
|---|---|---|---|
| wt. (g)/meq. wt | 1.0/3.57 | 1.0/3.57 | 1.0/3.57 |
| K-FLEX UD-320W Polyurethane-diol wt (g)/meq. wt. | 0.7/3.93 | 0.7/393 | 0.7/3.93 |
| Cymel 1135 % of total diol wt (g)/meq wt. | 1.5 0.97/7.5 | 1.5 0.97/7.5 | 1.5 0.97/7.5 |
| BYK 358 | 0.013/ | 0.013/ | 0.013/ |
| wt (g)/% of wt. | 0.5% | 0.5% | 0.5% |
| DNNDSA | 0.026/ | 0.013/ | 0.0093/ |
| wt (g)/% of wt. | 1% | 0.5% | 0.35% |
| $H_2O$ % of total wt in UD-320W | 2.58 | 2.60 | 2.60 |
| NVW % | 87.0% | 87.0% | 89.0% |
| Viscosity (2 sec$^{-1}$ 25° C.) | 1765 | 1720 | 1730 |
| Baking temp/time | 150° C./ 30 min | 150° C./ 30 min | 150° C./ 30 min |
| Direct Impact (Lb/in.) | 60 | 120 | 140 |
| Reverse Impact | 20 | 60 | 100 |
| Pencile Hardness | 1H | 1H | 1H |
| Adhesion | 3B | 3B | 3B |
| MEK Rub Resistance | >200 | >200 | >200 |

TABLE 20-continued

Effect of Catalyst Amount to Oligoester-diol of 1,3-BD (Mn 560).

| Film thickness (mil) | 0.7–0.8 | 0.8 | 0.7–08 |
|---|---|---|---|
| Appearance | transparent | transparent | transparent |

TABLE 21

Effect of Catalyst Amounts to Oligoester-diol of 1,3-BD (Mn 690).

| Oligoester-diol MN | 690 | 690 | 690 |
|---|---|---|---|
| wt. (g)/meq. wt | 1.5/4.35 | 1.5/4.35 | 1.5/4.35 |
| K-FLEX UD-320W Polyurethane diol wt (g)/meq. wt. | 0.8/4.49 | 0.8/4.49 | 0.8/4.49 |
| Cymel 1135 % of total diol wt (g)/meq. wt. | 1.5 1.14/13.26 | 1.5 1.14/13.26 | 1.5 1.14/13.26 |
| BYK 358 | 0.017/ | 0.017/ | 0.017/ |
| wt (g)/% of wt. | 0.5% | 0.5% | 0.5% |
| DNNDSA | 0.034/ | 0.017/ | 0.017/ |
| wt (g)/% of wt. | 1% | 0.5% | 0.35% |
| $H_2O$ % of total wt in UD-320W | 2.29 | 2.30 | 2.30 |
| NVW % | 88.0% | 87.0% | 88.0% |
| Viscosity (2 sec$^{-1}$ 25° C.) | 1860 | 1860 | 1860 |
| Baking temp/time | 150° C./ 30 min | 150° C./ 30 min | 150° C./ 30 min |
| Direct Impact (Lb/in.) | 60 | 120 | 140 |
| Reverse Impact (Lb/in.) | <20 | <100 | 100 |
| Pencil Hardness | 1H | 1H | 1H |
| Adhesion | 3B | 3B | 3B |
| MEK Rub Resistance | >200 | >200 | >200 |
| Film thickness (mil) | 0.8–0.9 | 0.8/0.9 | 0.7–0.8 |
| Appearance | transparent | transparent | transparent |

TABLE 22

Effect of Catalyst Amounts to Oligoester-diol of 1,3-BD (Mn 930).

| Oligoester-diol MN | 930 | 930 | 930 |
|---|---|---|---|
| wt. (g)/meq. wt | 1.31/2.82 | 1.31/2.82 | 1.31/2.82 |
| K-FLEX UD-320W wt (g)/meq. wt. | 0.5/2.81 | 0.5/2.81 | 0.5/2.81 |
| Cymel 1135 % of total diol wt (g)/meq. wt. | 1.5 0.72/8.43 | 1.5 0.72/8.43 | 1.5 0.72/8.43 |
| BYK 358 | 0.013/ | 0.013/ | 0.013/ |
| wt (g)/% of wt. | 0.5% | 0.5% | 0.5% |
| DNNDSA | 0.026/ | 0.013/ | 0.009/ |
| wt (g)/% of wt. | 1% | 0.5% | 0.35% |
| $H_2O$ % of total wt in UD-3320W | 1.95 | 1.96 | 1.96 |
| NVW % | 89.0% | 89.0% | 89.0% |
| Viscosity (2 sec$^{-1}$ 25° C.) | 2500 | 2500 | 2500 |
| Baking temp/time | 150° C./ 30 min | 150° C./ 30 min | 150° C./ 30 min |
| Direct Impact (Lb/in.) | 80 | 100 | 120 |
| Reverse Impact (Lb/in.) | <40 | <80 | 100 |
| Pencil Hardness | 1B | 1B | 1B |
| Adhesion | 4B | 3B | 4B |
| MEK Rub Resistance | >200 | >200 | >200 |

TABLE 22-continued

Effect of Catalyst Amounts to Oligoester-diol of 1,3-BD (Mn 930).

| | | | |
|---|---|---|---|
| Film thickness (mil) | 0.8–1.0 | 0.9–1.0 | 0.9 |
| Appearance | transparent | transparent | transparent |

TABLE 23

Formulation of 1,3-BD (Mn 350) with Polyurethane-diol, Melamine and Blocked-Polyisocyanate (Desmodur BL3175A)

| | | | |
|---|---|---|---|
| Oligoester-diol MN | 350 | 350 | 350 |
| wt. (g)/meq. wt | 5.0/28.57 | 5.0/28.57 | 5.0/28.57 |
| K-FLEX UD-320W wt (g)/meq. wt. | 0.5/28.10 | 0.5/28.10 | 0.5/28.10 |
| Cymel 1135 % of total diol | 1.25 | 1.25 | 1.25 |
| wt (g)/meq. wt | 4.87/56.67 | 4.87/56.67 | 4.87/56.67 |
| BL 3175A % of total diol | 20% | 20% | 20% |
| wt (g)/meq. wt | 4.19/11.33 | 4.19/11.33 | 4.19/11.33 |
| BYK 358 wt (g)/0.5% of wt | 0.10 | 0.10 | 0.10 |
| DNNDSA wt (g)/0.35% of wt | 0.07 | 0.07 | 0.07 |
| H₂O % of total wt in UD-320W | 2.62% | 4.00% | 10.00% |
| | 2.62% | 2.62% | 2.62% |
| added water | — | 1.38% | 7.38% |
| NVW % | 85.0% | 83.0% | 81.0% |
| Viscosity (2 sec⁻¹ 25° C.) | 1960 | 1575 | 770 |
| Baking temp/time | 140° C./ 30 min | 140° C./ 30 min | 140° C./ 30 min |
| Direct Impact (Lb/in.) | 120 | 160 | 120 |
| Reverse Impact (Lb/in.) | 80 | 100 | 100 |
| Pencil Hardness | 3H–4H | 3H–4H | 3H–4H |
| Adhesion | 4B | 4B | 4B |
| MEK Rub Resistance | >200 | >200 | >200 |
| Film thickness (mil) | 0.9 | 0.6–0.8 | 0.7–0.8 |
| Appearance | transparent | transparent | transparent |

TABLE 24

Formulation of 1,3-BD (Mn 455) with Polyurethane-diol, Melamine and Blocked-Polyisocyanate (Desmodur BL3175A)

| | | | |
|---|---|---|---|
| Oligoester-diol MN | 455 | 455 | 455 |
| wt. (g)/meq. wt | 10.0/43.9 | 10.0/43.9 | 10.0/43.9 |
| K-FLEX UD-320W wt (g)/meq. wt. | 10.0/56.2 | 10.0/56.2 | 10.0/56.2 |
| Cymel 1135 % of total diol | 1.25 | 1.25 | 1.25 |
| wt (g)/meq. wt. | 8.61/100.1 | 8.61/100.1 | 8.61/100.1 |
| BL 3175A % of total diol | 20% | 20% | 20% |
| wt (g)/ meq. wt | 7.41/20.0 | 7.41/20.0 | 7.41/20.0 |
| BYK 358 wt (g)/0.5% of wt | 0.18 | 0.18 | 0.18 |
| DNNDSA wt (g)/0.35% of wt | 0.18 | 0.18 | 0.18 |
| H₂O % of total wt in UD-320W | 2.75% | 5.00% | 10.00% |
| | 2.75% | 2.75% | 2.75% |
| added water | — | 2.25% | 7.25% |
| NVW % | 85.0% | 85.0% | 82.0% |
| Viscosity (2 sec⁻¹ 25° C.) | 2550 | 1900 | 874.8 |
| Baking temp/time | 140° C./ 30 min | 140° C./ 30 min | 140° C./ 30 min |
| Direct Impact | 160 | 160 | 120 |

TABLE 24-continued

Formulation of 1,3-BD (Mn 455) with Polyurethane-diol, Melamine and Blocked-Polyisocyanate (Desmodur BL3175A)

| | | | |
|---|---|---|---|
| (Lb/in.) | | | |
| Reverse Impact (Lb/in.) | 120 | 120 | 100 |
| Pencil Hardness | 3H | 3H–4H | 3H–4H |
| Adhesion | 3B | 4B | 5B |
| MEK Rub Resistance | >200 | >200 | >200 |
| Film thickness (mil) | 0.7–0.9 | 0.8–0.9 | 0.8–0.9 |
| Appearance | transparent and slightly yellowish | transparent and slightly yellowish | transparent and slightly yellowish |

TABLE 25

Formulation of 1,3-BD (Mn 455) with Polyurethane-diol, Melamine and Blocked-Polyisocyanate (A-B-H-E and A-B-H-P)

| | | | | |
|---|---|---|---|---|
| Oligoester-diol Mn | 455 | 455 | 455 | 455 |
| wt. (g)/meq. wt. | 1.0/4.39 | 1.0/4.39 | 1.0/4.39 | 1.0/4.39 |
| K-FLEX UD-320W wt (g)/meq. wt. | 1.0/5.62 | 1.0/5.62 | 1.0/5.62 | 1.0/5.62 |
| Cymel 1135 80% diol | 1.25 | 1.25 | 1.25 | 1.25 |
| wt (g)/meq. wt. | 0.86/10.0 | 0.86/10.0 | 0.86/10.0 | 0.86/10.0 |
| Leveling | BYK 358 | BYK 358 | BYK 358 | BYK 358 |
| wt (g)/0.5% | 0.017 | 0.017 | 0.017 | 0.017 |
| DNNDSA wt (g)/0.5% | 0.017 | 0.017 | 0.017 | 0.017 |
| Blocked Polyisocyanate | A-B-H-E | A-B-H-E | A-B-H-P | A-B-H-P |
| % of total diol | 20% | 20% | 20% | 20% |
| wt (g)/meq. wt | 0.51/2.0 | 0.51/2.0 | 0.51/2.0 | 0.51/2.0 |
| H₂O % of total wt. in UD 320 | 2.94 | 2.94 | 2.94 | 2.94 |
| Baking temp/time | 150° C./ 30 min. | 150° C./ 30 min. | 150° C./ 30 min. | 150° C./ 30 min. |
| Direct Impact (Lb/in.) | 160 | 160 | 160 | 160 |
| Reverse Impact (Lb/in.) | 120 | 120 | <80 | 80 |
| Pencil Hardness | 2H–3H | 2H–3H | 2h–3H | 4H |
| Adhesion | 4B | 3B–4B | 4B | 4B |
| MEK Rub Resist. | <100** | <200** | <50** | >200 |
| Film thickness | 0.7–1.2 | 0.8 | 0.6–0.8 | 0.8 |
| NVW % | 90.1 | 89.0 | 86.9 | 90.0 |
| Appearance | transparent* | transparent* | transparent* | transparent* |

*There are very fine solids in panel surfaces.
**Fine solid was removed.

EXAMPLE VI

Pigmented Water-Thinnable Solventless Coating.
A pigmented coating composition was prepared using the following formulation:

| | |
|---|---|
| Oligoester diol made from 1,4-butanediol and mixed dimethyl esters, made as described in Example IA, Mn = 313 | 20 g |
| Polyurethane diol UD-3320W (about 90% diol and 10% water by weight) | 20 g |
| Blocked isocyanate, made from butanone oxime and "Desmodur N3300" essentially as described in Example IB | 15.3 g |
| Melamine resin, HM-2612, described in Example IVC | 15.2 g |
| Titanium dioxide pigment, obtained from DuPont as "R-900" | 26.8 g |

| Pigmented Water-Thinnable Solventless Coating. A pigmented coating composition was prepared using the following formulation: | |
|---|---|
| Catalyst; dinonyl naphthalene disulfonic acid | 0.35 g |
| Surface tension modifier, BYK-302 | 0.21 g |
| Pigment dispersion stabilizer, "Joncryl-60" obtained from S. C. Johnson Polymer | 3.5 g |

The pigment was dispersed by grinding in a high speed disperser for about 45 minutes. The resulting coating composition was a viscous, shear-thinning material having a Brookfield viscosity of 32.7 Pa.s at 0.3 rpm and 14.5 Pa.s at 1.5 rpm. It was difficult to cast coatings with good appearance from this composition because of the persistent presence of air bubbles.

To a portion of the above composition was added 15 weight percent of water. The mixture was agitated for about 15 minutes on a high speed disperser to give a fluid, water-thinned coating composition. Its Brookfield viscosity was 0.60 Pa.s at 0.3 rpm, 0.51 Pa.s at 1.5 rpm, and 0.46 Pa.s at 60 rpm. Its viscosity on an ICI viscometer at ambient temperature was 4.8 Pa.s. This coating composition was stable to storage at about 25° C. for more than three weeks. It was easily cast on a R-36-1 panel as described in Example IC and baked at about 143° C. for 30 minutes to give a smooth, glossy coating.

At a film thickness of 0.85 to 1.0 mil, the baked, water-thinned coating had MEK rub resistance of >200 rubs, adhesion of 5B, pencil hardness of 3H, direct impact resistance of 160 in-lb, and reverse impact resistance of 140 in-lb.

What is claimed is:

1. A liquid polymeric vehicle effective for providing a coating binder and for providing a formulated coating composition having less than about three weight percent organic solvent and which formulated coating composition includes at least about 3 weight percent water, the polymeric vehicle comprising:

a linear or substantially linear oligoester diol having a molecular weight in the range of from about 275 to about 3000 and a polydispersity index of less than about 2.6; and a hardening carbamate crosslinker selected from the group consisting of a polyisocyanate, polyfunctional biuret, blocked polyisocyanate, blocked polyfunctional biuret, a carbamate polyol and mixtures thereof, the harding carbamate crosslinker reactive with the oligoester diol or reactive with an additional crosslinker which is reactive with the oligoester diol, the hardening carbamate crosslinker not reactive with water and in an amount effective for providing the coating binder with from about 3 to about 20 weight percent carbamate groups based upon the weight of the coating binder, the oligoester diol having a molecular weight and structure effective for providing a liquid formulated coating composition when combined with at least about three weight percent water and not more than about three weight percent organic solvent, the hardening carbamate crosslinker and oligoester diol in relative amounts effective for permitting the formulated coating composition to imbibe at least about 3 weight percent water, based upon the weight of the formulated coating composition, to provide a water thinned formulated coating composition with a viscosity of less than about 1.5 Pa.s at about 20° C. to about 60° C. at a shear rate of about 3 sec.$^{-1}$, the polymeric vehicle effective for providing the coating binder with a hardness of at least about H when applied to and thermoset on a substrate at a thickness of one mil dry.

2. A polymeric vehicle as recited in claim 1 wherein the carbamate crosslinker is selected from the group consisting of a blocked polyisocyanate, blocked polyfunctional biuret, a polyurethane polyol and mixtures thereof.

3. A polymeric vehicle as recited in claim 2 wherein the polymeric vehicle is effective for providing a water thinned formulated coating composition having a viscosity of less than about 1.2 Pa.s.

4. A polymeric vehicle as recited in claims 1, 2 or 3, wherein the polymeric vehicle is effective for providing a formulated coating compositions which includes at least 8 weight percent water.

5. A liquid polymeric vehicle effective for providing a solventless formulated coating composition which includes at least about 3 weight percent water and not more than 3 weight percent organic solvent, the polymeric vehicle comprising:

an oligoester diol having a number average molecular weight in the range of from about 275 to about 3000 and selected from the group consisting of a substantially linear oligoester diol, a linear oligoester diol and mixtures thereof; and from about 2.0 to about 80 weight percent of a hardening carbamate crosslinker based upon the weight of the oligoester diol and hardening carbamate crosslinker, the hardening carbamate crosslinker selected from the group consisting of a polyisocyanate, polyfunctional biuret, blocked polyisocyanate, blocked polyfunctional biuret, a carbamate polyol and mixtures thereof, the carbamate crosslinker reactive with the oligoester diol or reactive with an additional crosslinker which is reactive with the oligoester diol, the hardening carbamate crosslinker not reactive with water, the hardening carbamate crosslinker and oligoester diol in relative amounts effective for permitting the formulated coating composition to imbibe at least about 3 weight percent water, based upon the weight of the formulated coating composition, to provide a water thinned formulated coating composition with a viscosity of less than about 1.5 Pa.s at about 20° C. to about 60° C. at a shear of about 3 sec.$^{-1}$, the polymeric vehicle effective for providing a coating binder having a hardness of at least about H when applied and thermoset on a substrate at a thickness of one mil dry.

6. A polymeric vehicle as recited in claim 5 wherein the carbamate crosslinker is selected from the group consisting of a blocked polyisocyanate, blocked polyfunctional biuret, a polyurethane polyol and mixtures thereof.

7. A polymeric vehicle as recited in claim 6 wherein the water thinned formulated coating composition has a viscosity of less than about 1.2 Pa.s.

8. A polymeric vehicle as recited in claims 5, 6, or 7, wherein the polymeric vehicle is effective for providing a formulated coating compositions which includes at least 8 weight percent water.

9. A liquid polymeric vehicle effective for providing a solventless formulated coating composition which includes at least about 3 weight percent water, the polymeric vehicle comprising:

an oligoester diol having a number average molecular weight in the range of from about 275 to about 3000 and selected from the group consisting of a substantially linear oligoester diol, a linear oligoester diol and mixtures thereof;

a polyurethane polyol; and a crosslinker reactive with the oligoester diol and polyurethane polyol and which is not reactive with water, the oligoester diol, crosslinker and polyurethane diol in relative amounts effective for providing a coating binder with from about 3 to about 20 weight percent carbamate groups based upon the weight of a coating binder and permitting the formulated coating composition to imbibe at least about 3 weight percent water, based upon the weight of the formulated coating composition, to provide a water thinned formulated coating composition with a viscosity of less than about 1.5 Pa.s at about 20° C. to about 60° C. at a shear of about 3 sec$^{-1}$, the polymeric vehicle effective for providing the coating binder with a hardness of at least about H when applied to and thermoset on a substrate at a thickness of one mil dry.

10. A polymeric vehicle as recited in claim 9 wherein the water thinned formulated coating composition has a viscosity of less than about 1.2 Pa.s.

11. A polymeric vehicle as recited in claims 9 or 10, wherein the polymeric vehicle is effective for providing a formulated coating compositions which includes at least 8 weight percent water.

12. A polymeric vehicle effective for providing a solventless formulated coating composition which includes at least about 3 weight percent water, the polymeric vehicle comprising:

from about 20 to about 60 weight percent, based upon the weight of the polymeric vehicle, of an oligoester diol selected from the group consisting of a substantially linear oligoester diol, a linear oligoester diol and mixtures thereof;

from about 5 to about 50 weight percent, based upon the weight of the polymeric vehicle, of a polyurethane polyol; and from about 10 to about 50 weight percent, based upon the weight of the polymeric vehicle, of a crosslinker reactive with the oligoester diol and polyurethane polyol and which is not reactive with water, the oligoester diol and polyurethane polyol in relative amounts effective for permitting the formulated coating composition to imbibe at least about 3 weight percent water, based upon the weight of the formulated coating composition, to provide a water thinned formulated coating composition with a viscosity of less than about 1.5 Pa.s at about 20° C. to about 60° C. at a shear rate of about 3 sec.$^{-1}$, the polymeric vehicle effective for providing a coating binder having a hardness of at least about H when applied to and thermoset on a substrate at a thickness of one mil dry.

13. A formulated coating composition comprising:

a liquid polymeric vehicle; and at least about 3 weight percent water, the polymeric vehicle comprising a oligoester diol having a number average molecular weight in the range of from about 275 to about 3000 and selected from the group consisting of a substantially linear oligoester diol, a linear oligoester diol and mixtures thereof, and a hardening carbamate crosslinker selected from the group consisting of a polyisocyanate, polyfunctional biuret, blocked polyisocyanate, blocked polyfunctional biuret, a carbamate polyol and mixtures thereof, the carbamate crosslinker reactive with the oligoester diol or reactive with a crosslinker which is reactive with the oligoester diol, the carbamate hardener not reactive with water, the carbamate hardener, crosslinker and oligoester diol in relative amounts effective for providing a coating binder with from about 3 to about 20 weight percent carbamate groups based upon the weight of a coating binder and permitting the formulated coating composition to imbibe at least about 3 weight percent water, based upon the weight of the formulated coating composition, to provide a water thinned formulated coating composition with a viscosity of less than about 1.5 Pa.s at about 20° C. to about 60° C. at a shear rate of 3 about sec.$^{-1}$, the polymeric vehicle effective for providing the coating binder with a hardness of at least about H when applied to and thermoset on a substrate at a thickness of one mil dry.

14. A formulated coating composition as recited in claim 13 wherein the carbamate crosslinker is selected from the group consisting of a blocked polyisocyanate, a blocked polyfunctional biuret, a polyurethane polyol and mixtures thereof.

15. A formulated coating composition as recited in claims 13 or 14, wherein the polymeric vehicle is effective for providing a formulated coating compositions which includes at least 8 weight percent water.

16. A polymeric vehicle as recited in claim 12 wherein the polymeric vehicle is effective for providing a formulated coating compositions which includes at least 8 weight percent water.

17. A liquid polymeric vehicle effective for providing a coating binder and for providing a formulated coating composition having less than about three weight percent organic solvent and which formulated coating composition includes at least about 3 weight percent water, the polymeric vehicle comprising:

a linear or substantially linear oligoester diol having a molecular weight in the range of from about 275 to about 3000 and a polydispersity index of lees than about 2.6, wherein the oligoester is the reaction product of components selected from the group consisting of (1) a diol and a carboxylic acid or an ester thereof wherein the acid has an odd number of carbon atoms, (2) a mixture of different carboxylic acids, esters thereof or different diols, and (3) mixtures of (1) and (2), and wherein there is not more than 16 carbon atoms in the carboxylic acid and diol; and a hardening carbamate crosslinker selected from the group consisting of a polyisocyanate, polyfunctional biuret, blocked polyisocyanate, blocked polyfunctional biuret, a carbamate polyol and mixtures thereof, the harding carbamate crosslinker reactive with the oligoester diol or reactive with an additional crosslinker, wherein the carbamate crosslinker is reactive with the oligoester diol, the hardening carbamate crosslinker not reactive with water and in an amount effective for providing the coating binder with from about 3 to about 20 weight percent carbamate groups based upon the weight of the coating binder, the oligoester diol having a molecular weight and structure effective for providing a liquid formulated coating composition when combined with at least about three weight percent water and not more than about three weight percent organic solvent, the hardening carbamate crosslinker and oligoester diol in relative amounts effective for permitting the formulated coating composition to imbibe at least about 3 weight percent water, based upon the weight of the formulated coating composition, to provide a water thinned formulated coating composition with a viscosity of less than about 1.5 Pa.s at about 20° C. to about 60° C. at a shear rate of about 3 $sec^{-1}$, the polymeric vehicle effective for providing the coating binder with a hardness of at least about H when applied to and thermoset on a substrate at a thickness of one mil dry.

18. A polymeric vehicle as recited in claim 17 wherein the polymeric vehicle is effective for providing a formulated coating compositions which includes at least 8 weight percent water.

* * * * *

UNITED STATES PATENT AND TRADEMARK OFFICE
CERTIFICATE OF CORRECTION

PATENT NO. : 5,610,263
DATED : March 11, 1997
INVENTOR(S) : Jones et al.

It is certified that error appears in the above-indentified patent and that said Letters Patent is hereby corrected as shown below:

Claim 5, column 36, line 29, change "2.0" to --20--.

Claim 5, column 36, line 49, after "applied" insert --to--.

Claim 17, column 38, line 49, change "lees" to --less--.

Signed and Sealed this

Fourteenth Day of October, 1997

Attest:

BRUCE LEHMAN

Attesting Officer

Commissioner of Patents and Trademarks